United States Patent [19]

Katayama et al.

[11] Patent Number: 5,375,448
[45] Date of Patent: Dec. 27, 1994

[54] NON-INTERFERENCE CONTROL METHOD AND DEVICE

[75] Inventors: Yasunori Katayama, Mito; Yasuo Morooka; Taiko Takano, both of Hitachi; Harumi Maruyama; Itsuo Shimizu, both of Katsuta; Satoshi Hattori; Yutaka Saito, both of Hitachi, all of Japan

[73] Assignee: Hitachi, Ltd., Tokyo, Japan

[21] Appl. No.: 47,548

[22] Filed: Mar. 1, 1993

Related U.S. Application Data

[63] Continuation of Ser. No. 712,993, Jun. 10, 1991, abandoned, which is a continuation of Ser. No. 593,478, Oct. 3, 1990, abandoned, which is a continuation of Ser. No. 350,746, Apr. 12, 1989, abandoned.

[30] Foreign Application Priority Data

Aug. 12, 1987 [JP] Japan ................. 62-199770
Aug. 28, 1987 [JP] Japan ................. 62-212813

[51] Int. Cl.⁵ ............... B21B 37/00; G05B 13/04; G06F 15/46
[52] U.S. Cl. .................................. 72/8; 72/11; 364/149; 364/472
[58] Field of Search ............................. 72/8-12; 364/148-151, 176, 571.02, 571.04, 472

[56] References Cited

U.S. PATENT DOCUMENTS

| | | | |
|---|---|---|---|
| 3,891,836 | 6/1975 | Lee | 364/149 |
| 3,934,438 | 1/1976 | Arimura et al. | 72/9 |
| 4,500,950 | 2/1985 | Putman | 364/138 |
| 4,551,805 | 11/1985 | Shimoda et al. | 72/11 |
| 4,576,027 | 3/1986 | Yoshida et al. | 72/11 |
| 4,577,280 | 3/1986 | Putman | 364/148 |
| 4,688,180 | 8/1987 | Motomiya | 432/11 |
| 4,710,864 | 12/1987 | Li | 364/148 |
| 4,725,942 | 2/1988 | Osuka | 364/150 |
| 4,726,213 | 2/1988 | Manchu | 72/9 |
| 4,774,667 | 9/1988 | Kuraoka et al. | 364/150 |

FOREIGN PATENT DOCUMENTS

| | | |
|---|---|---|
| 1300715 | 8/1969 | Germany . |
| 51-01665 | 3/1974 | Japan . |
| 53-126482 | 4/1978 | Japan . |
| 56-145703 | 11/1981 | Japan . |
| 59-77504 | 5/1984 | Japan . |
| 59-202108 | 11/1984 | Japan . |

OTHER PUBLICATIONS

Proc. of the 1986 IEEE International Conf. on Systems, Man and Cybernetics, Oct. 1986, pp. 1260–1265, P. P. Groumpos et al., article entitled "The Block–Arrow–Structure (BAS) Control Approach to Large Scale Systems", paragraphs 2–4.

*Primary Examiner*—Lowell A. Larson
*Assistant Examiner*—Thomas C. Schoeffler
*Attorney, Agent, or Firm*—Antonelli, Terry Stout & Kraus

[57] ABSTRACT

A non-interference control method and device in which an object to be controlled, which is controlled by a plurality of operation quantities and at least one control quantity, is divided into a plurality of partial control systems so that each of the partial control systems has at least one operation quantity and at least one partial control system has more than two operation or control quantities, wherein to the operation quantity in one partial control system is added a compensating element which annuls influences exerted by other partial control systems on said one partial control system, said object to be controlled being controlled on the basis of the relevant compensated operation quantity.

6 Claims, 23 Drawing Sheets

FIG. 3

(A) 
$$\frac{d}{dt}\begin{bmatrix}\Delta h_1\\ \Delta V_{R1}\\ \Delta T_1\\ \Delta h_2\\ \Delta V_{R2}\\ \Delta T_2\\ \Delta h_3\\ \Delta V_{R3}\\ \Delta T_3\end{bmatrix} = \begin{bmatrix}a_{11} & 0 & a_{13} & 0 & 0 & 0 & 0 & 0 & 0\\ 0 & a_{22} & 0 & 0 & 0 & 0 & 0 & 0 & 0\\ a_{31} & a_{32} & a_{33} & a_{34} & a_{35} & a_{36} & 0 & 0 & 0\\ 0 & 0 & 0 & a_{44} & 0 & a_{46} & 0 & 0 & 0\\ 0 & 0 & 0 & 0 & a_{55} & 0 & 0 & 0 & 0\\ 0 & 0 & 0 & a_{64} & a_{65} & a_{66} & a_{67} & a_{68} & a_{69}\\ 0 & 0 & 0 & 0 & 0 & a_{76} & a_{77} & 0 & a_{79}\\ 0 & 0 & 0 & 0 & 0 & 0 & 0 & a_{88} & 0\\ 0 & 0 & 0 & 0 & 0 & a_{96} & a_{97} & a_{98} & a_{99}\end{bmatrix}\begin{bmatrix}\Delta h_1\\ \Delta V_{R1}\\ \Delta T_1\\ \Delta h_2\\ \Delta V_{R2}\\ \Delta T_2\\ \Delta h_3\\ \Delta V_{R3}\\ \Delta T_3\end{bmatrix} + \begin{bmatrix}b_{11} & 0 & 0 & 0 & 0 & 0\\ 0 & b_{22} & 0 & 0 & 0 & 0\\ 0 & 0 & 0 & 0 & 0 & 0\\ 0 & 0 & b_{33} & 0 & 0 & 0\\ 0 & 0 & 0 & b_{44} & 0 & 0\\ 0 & 0 & 0 & 0 & 0 & 0\\ 0 & 0 & 0 & 0 & b_{55} & 0\\ 0 & 0 & 0 & 0 & 0 & b_{66}\\ 0 & 0 & 0 & 0 & 0 & 0\end{bmatrix}\begin{bmatrix}\Delta S_{P1}\\ \Delta V_{P1}\\ \Delta S_{P2}\\ \Delta V_{P2}\\ \Delta S_{P3}\\ \Delta V_{P3}\end{bmatrix}$$

$$+ \begin{bmatrix}d_{11} & d_{12} & 0 & 0\\ 0 & 0 & 0 & 0\\ d_{31} & d_{32} & d_{33} & 0\\ 0 & 0 & d_{43} & 0\\ 0 & 0 & d_{53} & d_{54}\\ 0 & 0 & 0 & d_{64}\\ 0 & 0 & 0 & 0\\ 0 & 0 & 0 & 0\\ 0 & 0 & 0 & d_{66}\end{bmatrix}\begin{bmatrix}\Delta T_0\\ \Delta H_1\\ \Delta H_2\\ \Delta H_3\end{bmatrix}$$

(B) $\dot{X} = AX + BU + DW$

FIG. 5

$$X = \begin{bmatrix} \Delta h_1 \\ \Delta VR_1 \\ \Delta T_1 \\ \Delta h_2 \\ \Delta VR_2 \\ \Delta T_2 \\ \Delta h_3 \\ \Delta VR_3 \\ \Delta T_3 \end{bmatrix} = \begin{Bmatrix} X_1 \\ X_2 \\ X_3 \end{Bmatrix} \quad U = \begin{bmatrix} \Delta SP_1 \\ \Delta VR_1 \\ \Delta SP_2 \\ \Delta VR_2 \\ \Delta SP_3 \\ \Delta VR_3 \end{bmatrix} = \begin{Bmatrix} U_1 \\ U_2 \\ U_3 \end{Bmatrix} \quad W = \begin{bmatrix} \Delta T_0 \\ \Delta H_1 \\ \Delta H_2 \\ \Delta H_3 \end{bmatrix} = \begin{Bmatrix} W_1 \\ W_2 \\ W_3 \end{Bmatrix}$$

$$A_1 = \begin{bmatrix} a_{11} & 0 & a_{13} \\ 0 & a_{22} & 0 \\ a_{31} & a_{32} & a_{33} \end{bmatrix} \quad A_2 = \begin{bmatrix} a_{44} & 0 & a_{46} \\ 0 & a_{55} & 0 \\ a_{64} & a_{65} & a_{66} \end{bmatrix} \quad A_3 = \begin{bmatrix} a_{77} & 0 & a_{79} \\ 0 & a_{88} & 0 \\ a_{97} & a_{98} & a_{99} \end{bmatrix}$$

$$B_1 = \begin{bmatrix} b_{11} & 0 \\ 0 & b_{22} \end{bmatrix} \quad B_2 = \begin{bmatrix} b_{33} & 0 \\ 0 & b_{44} \end{bmatrix} \quad B_3 = \begin{bmatrix} b_{55} & 0 \\ 0 & b_{66} \end{bmatrix}$$

⇓ 150

$$\dot{X} = AX + BU$$

$$= \begin{bmatrix} A_1 & 0 & 0 \\ 0 & A_2 & 0 \\ 0 & 0 & A_3 \end{bmatrix} \begin{bmatrix} X_1 \\ X_2 \\ X_3 \end{bmatrix} + \begin{bmatrix} B_1 & 0 & 0 \\ 0 & B_2 & 0 \\ 0 & 0 & B_3 \end{bmatrix} \begin{bmatrix} U_1 \\ U_2 \\ U_3 \end{bmatrix}$$

160

⇓

$$\dot{X}_1 = A_1 X_1 + B_1 U_1 \quad , \quad \dot{X}_2 = A_2 X_2 + B_2 U_2$$

$$\dot{X}_3 = A_3 X_3 + B_3 U_3$$

170

F I G. 6
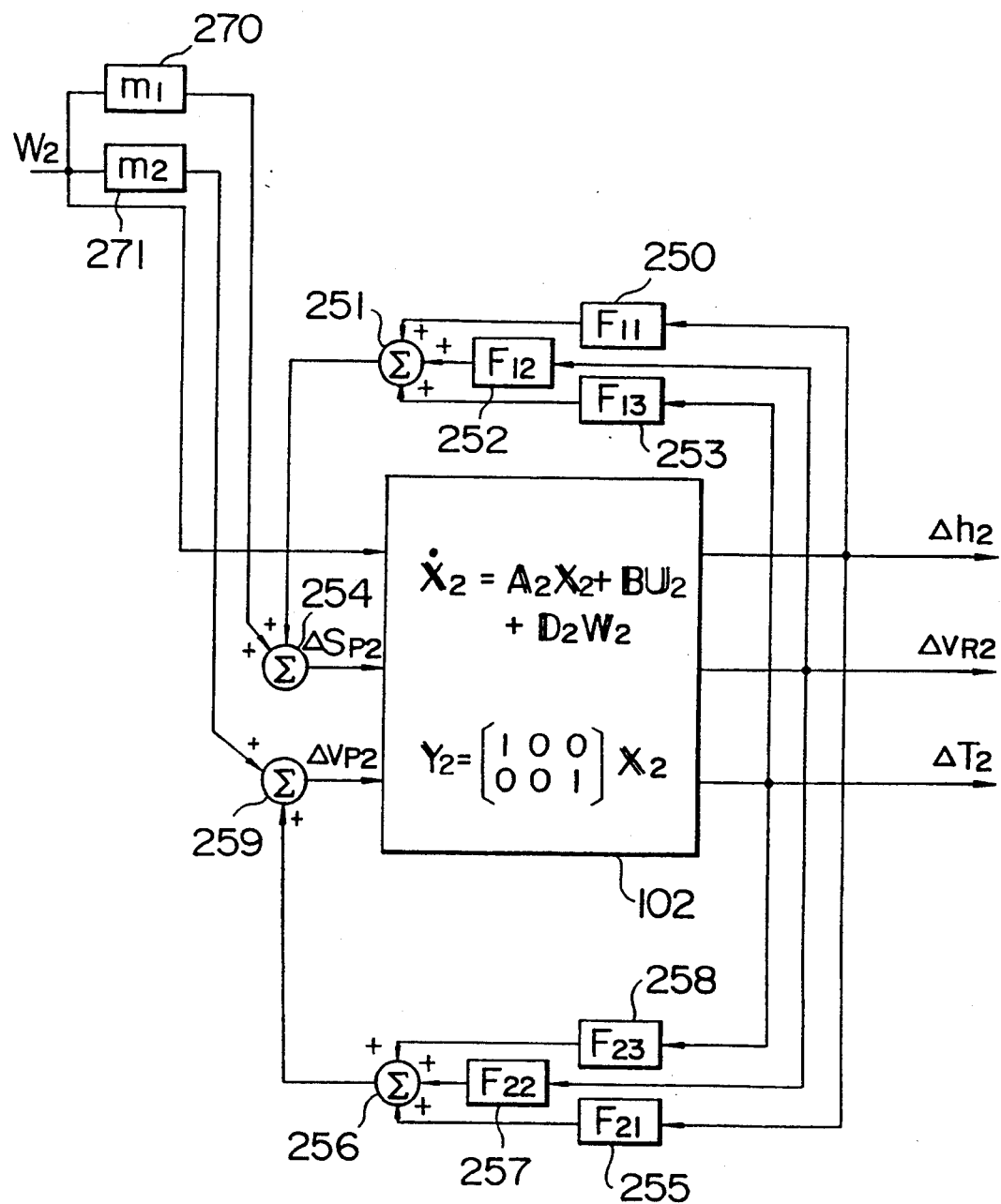

F I G. 13
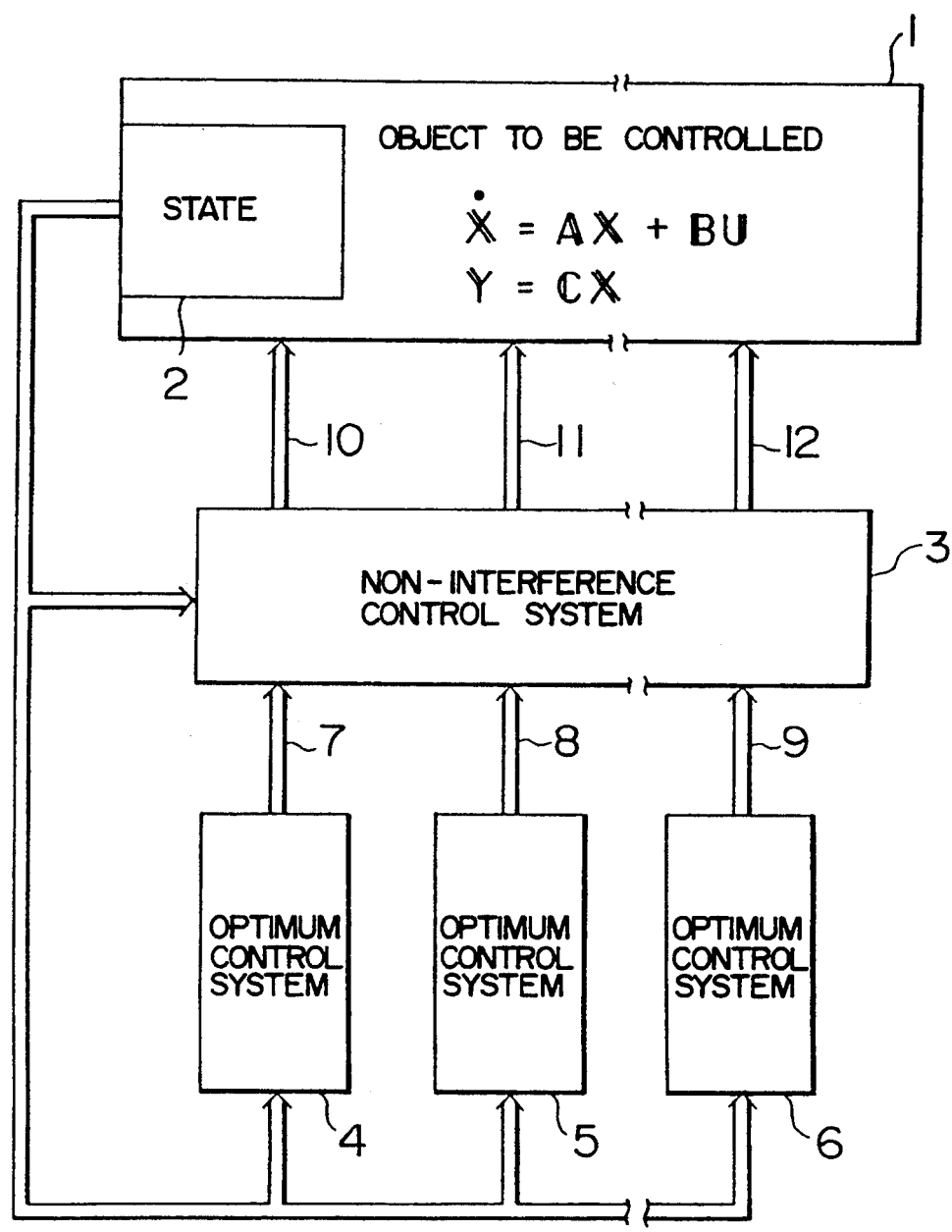

FIG. 14

(A)
$$\frac{dX}{dt} = \frac{d}{dt}\begin{Bmatrix} x_1 & \cdots & x_i & \cdots & x_j & \cdots & x_N \end{Bmatrix} = \begin{Bmatrix} a_{11} & \cdots & a_{1N} \\ \vdots & & \vdots \\ a_{i1} & \cdots & a_{iN} \\ a_{j1} & & a_{NN} \\ \vdots & & \vdots \\ a_{N1} & \cdots & a_{NN} \end{Bmatrix} \begin{Bmatrix} x_1 \\ x_i \\ x_j \\ x_N \end{Bmatrix} + \begin{Bmatrix} b_{11} & b_{12} \cdots b_{1N} \\ \vdots & \vdots \\ b_{i1} & b_{ij} & b_{jj} \cdots \\ b_{N1} & \cdots & b_{NN} \end{Bmatrix} \begin{Bmatrix} U_1 \\ \vdots \\ U_N \end{Bmatrix}$$

(B) $\dot{X} = AX + BU = (A_D + A_N)X + (B_D + B_N)U$

F I G. 15

$$A_D = \begin{bmatrix} a_{11} & & & \\ & a_{22} & & O \\ & & \ddots & \\ O & & & a_{NN} \end{bmatrix}$$

$$A_N = \begin{bmatrix} O & a_{12} & a_{13} & \cdots & a_{1N} \\ a_{21} & O & & & \vdots \\ \vdots & & \ddots & & a_{N-1N} \\ a_{N1} & \cdots & \cdots & a_{NN-1} & O \end{bmatrix}$$

$$B_D = \begin{bmatrix} b_{11} & & & & \\ & b_{22} & & & O \\ & & b_{ii} & & \\ O & & & \ddots & \\ & & & & b_{NN} \end{bmatrix}$$

$$B_N = \begin{bmatrix} O & b_{12} & \cdots & \cdots & b_{1N} \\ b_{21} & O & & & \vdots \\ \vdots & & \ddots & & b_{N-1N} \\ b_{N1} & \cdots & \cdots & b_{NN-1} & O \end{bmatrix}$$

F I G. 16
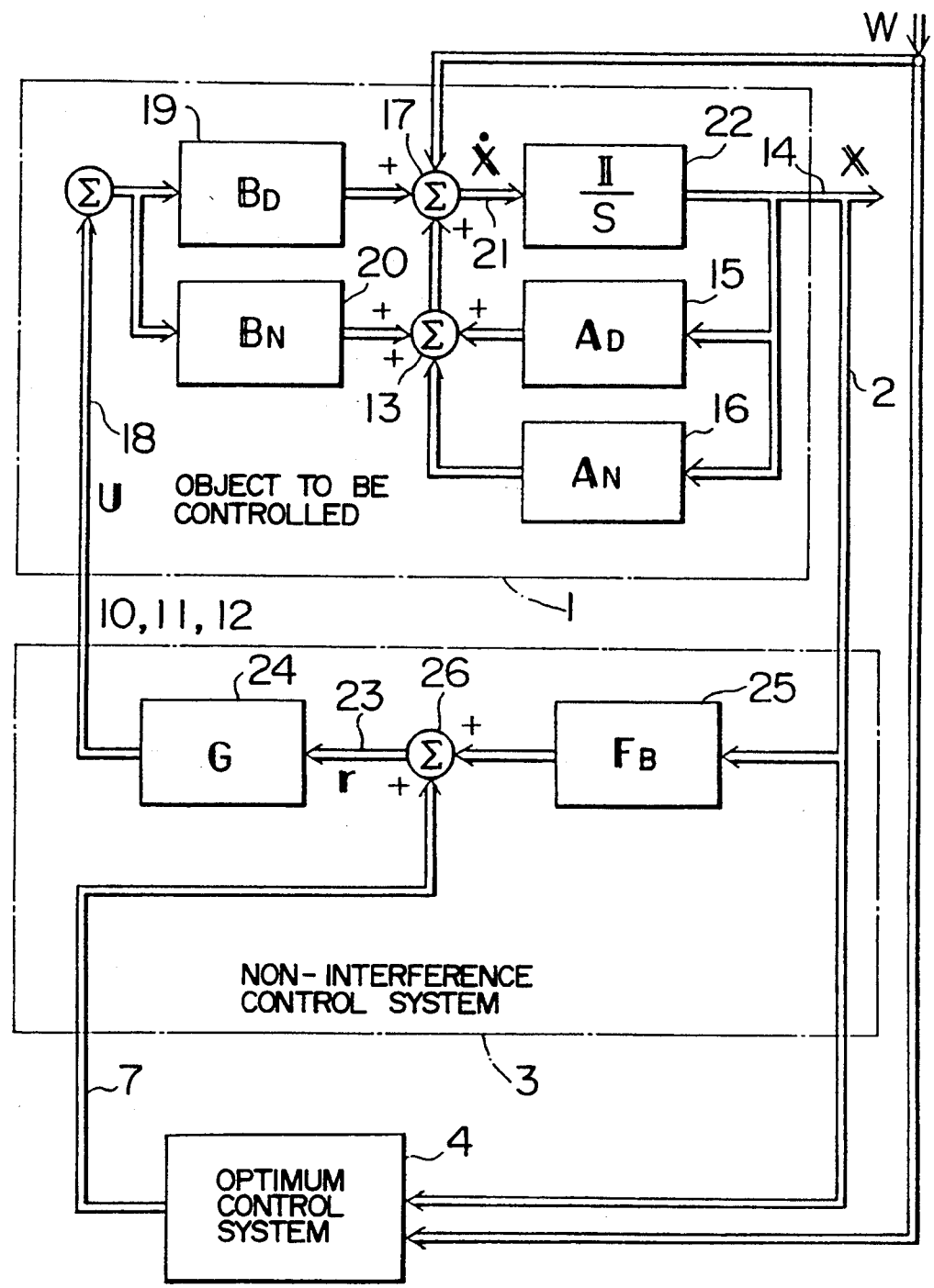

F I G. 20A
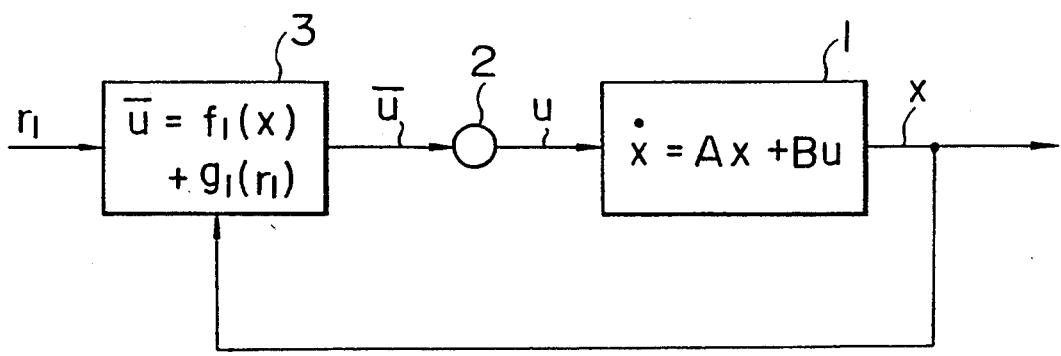
F I G. 20B
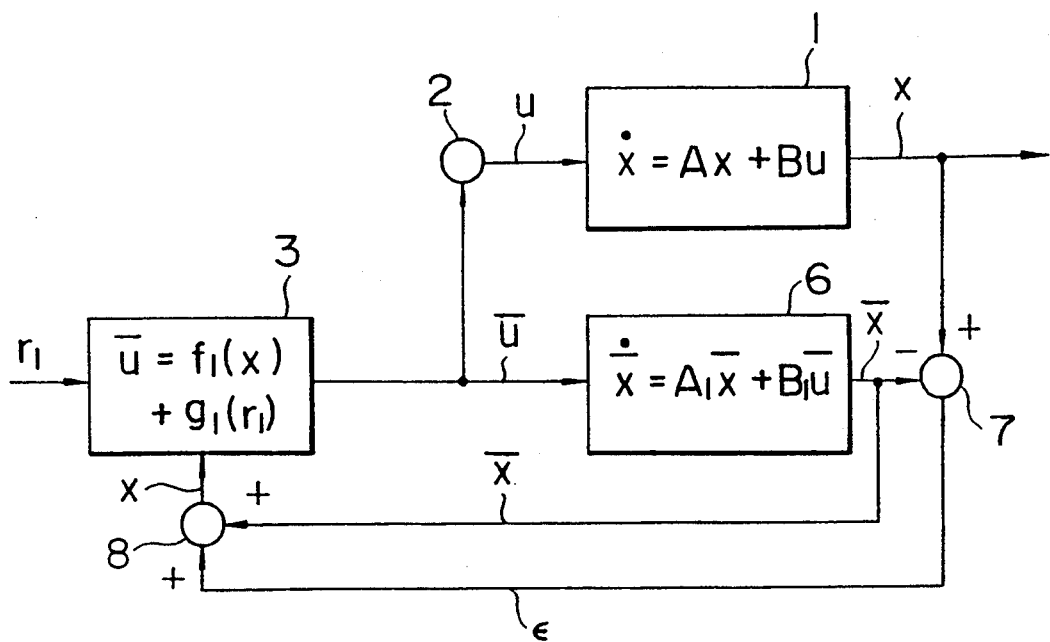

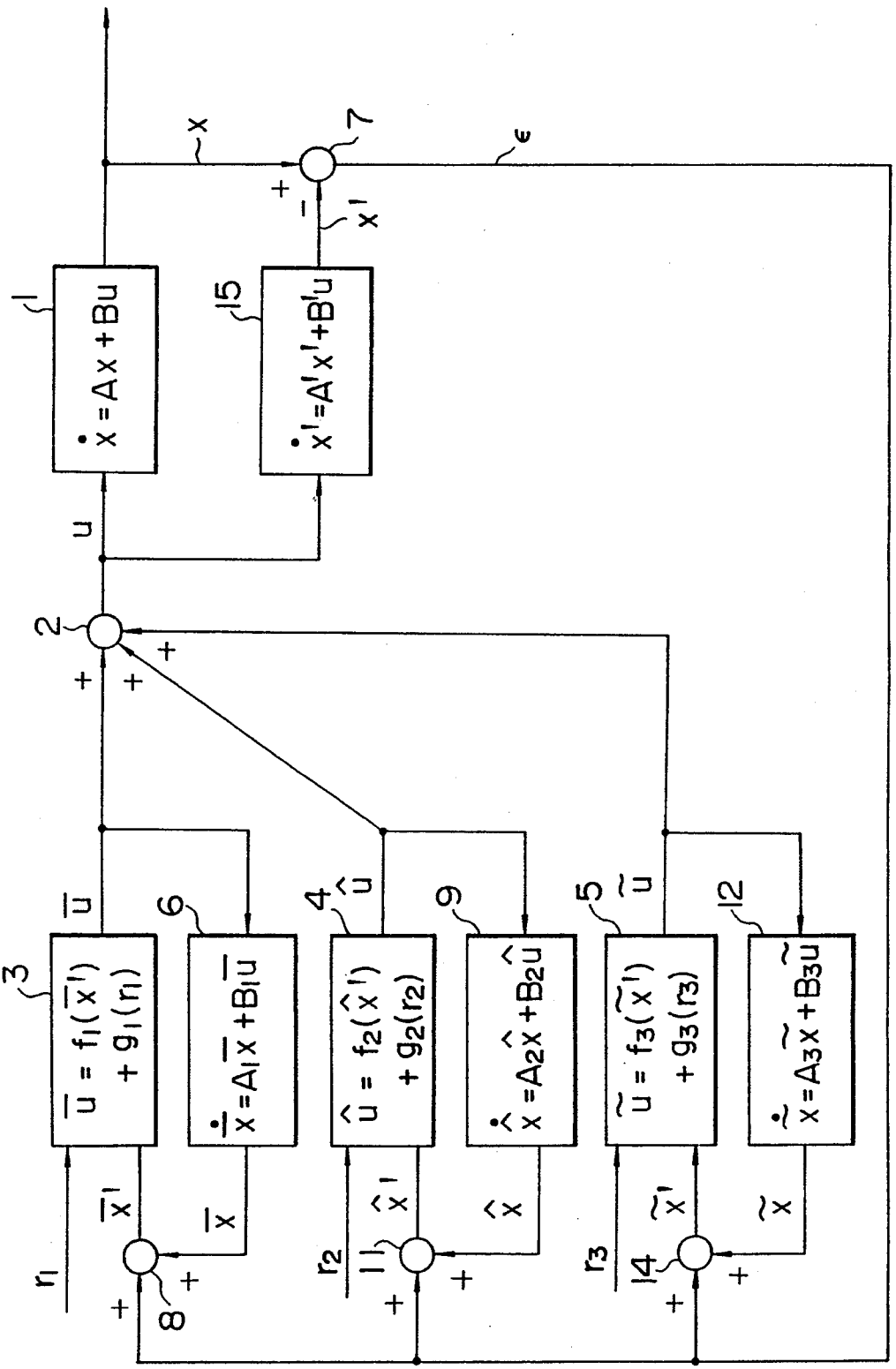
F I G. 22

NON-INTERFERENCE CONTROL METHOD AND DEVICE

This application is a continuation of application Ser. No. 712,993 filed on Jun. 10, 1991, now abandoned, which is a continuation of application Ser. No. 593,478 filed on Oct. 3, 1990, now abandoned, which is a continuation of application Ser. No. 350,746 filed on Apr. 12, 1989, now abandoned.

TECHNICAL FIELD

This invention relates to a method and a device for controlling an object to be controlled, such as a plants, etc., having a plurality of variables necessary for the control of the object.

BACKGROUND ART

In a system in which there exist a plurality of variables (called control quantities) necessary for controlling an object to be controlled, when quantities used to operate the object to be controlled (called operation quantities) are regulated in various manners in order to determine a control quantity, other control quantities may be influenced thereby. This phenomenon is called in general "interference of control quantities" and decreases the precision and the stability of the control.

For example, in a control system for a rolling mill, supposing that control quantities are the plate outlet thickness of the rolled material and the forward tension and operation quantities are a roller position reference or instruction and a rolling speed instruction of the rolling mill, when an operation is carried out according to the roller position instruction and the rolling speed instruction in order to control the plate outlet thickness to be a predetermined value, the forward tension, which is the other control quantity, may be interfered with, thereby being varied.

Heretofore, in order to prevent such an interference, a method has been proposed (JP-A-59-17920, JP-A-59-202108) by which mutual interference between different control quantities is compensated for in advance by varying inputs in a multiple variable control system having three inputs (operation quantities) and three outputs (control quantities) (a control system for a rolling mill). In these prior art techniques, mutual interference between control quantities is eliminated so as to achieve the relation of 1-input-1-output.

Apart therefrom, JP-A-58-207103, JP-A-59-226903. JP-A-61-131103 and JP-A-62-144811 can be cited as prior art techniques relating to this invention.

According to the prior art examples described above, mutual interference is eliminated for all the control quantities. According to such methods, in the case where the scale of the object to be controlled is enlarged, i.e. in the case where the number of control quantities increases, the amount of operations necessary for eliminating the interference becomes enormous. For example, if the number of lines or rows is multiplied by in a matrix operation carried out in the process for eliminating the interference, the number of calculations required for each matrix operation is multiplied by $n^2$. This gives rise to disadvantages that the device necessary for the control is enlarged, that delay in the control time takes place, which makes it impossible to effect control in real time, etc.

Further, since particular characteristics of the object to be controlled were not taken into account and the elimination of the interference was effected equally for all the control quantities, there was a problem that it was difficult to effect the control without performing useless operations and with a high efficiency.

Further, the prior art examples described above had another problem that they consist exclusively in decomposing an n-input-n-output system into 1-input-1-output systems and therefore they are incapable of coping with an n-input-m-output (nm) system.

Furthermore, in the prior art examples, there is disposed, apart from a driving system control device, another device, called a compensation operating device, having a function different from that of the driving system control device in order to eliminate mutual interference among the plate thickness control, one shape control and the tension control of the rolled material. It was found that, in the case where it is tried to control a same object to be controlled by means of a plurality of control means having different functions in this way, an undesirable interference reaction takes place mutually among these control means, which gives rise to an inconvenience that the desired object may not be achieved satisfactorily.

That is, taking as an example a case where a plurality of control means having different functions are non-interference control means and operation quantity control means as in the prior art example, state quantities are varied by performing certain operations on the state quantities of the object to be controlled by means of the non-interference control means in order to eliminate interference among control quantities. After that, when operation quantities are calculated by means of the operation quantity control means (e.g. optimum control means) on the basis of the state quantities thus varied, the varied state quantities, which have been varied to eliminate the interference, are regarded as control deviations, and the operation quantity control means are operated so as to annul these deviations. In other words, the control is effected so as to reduce the deviations without distinguishing between state quantities which have been varied by external perturbations, and state quantities which have been varied by the non-interference control. Here, control deviation means the difference between the final target value of the control and the actual value of the control.

As a result, the desired control object is not achieved because working points of the operation quantity control means vary, unexpected control is effected, etc.

DISCLOSURE OF THE INVENTION

An object of this invention is to provide a control method and a device for realizing the same capable of removing the disadvantages of the prior art examples described above and eliminating interference among control quantities without enlarging the control device or delaying the control time even for a large scale object to be controlled having a number of control quantities.

Another object of this invention is to provide a non-interference control method and a device for realizing the same, which works without performing useless operations and with a high efficiency.

Still another object of this invention is to provide a non-interference control method and a device for realizing the same capable of effecting an efficient non-interference control even for an object to be controlled for which the number of inputs (operation quantities) differs from the number of outputs (control quantities).

Still another object of this invention is to provide a control device capable of removing the disadvantages of the prior art examples described above and preventing influence or interference produced among the plurality of control means in the case where an object to be controlled is controlled by means of a plurality of control means having different functions.

In order to achieve such objects, the method according to this invention is characterized in that the whole object to be controlled is divided into a plurality of partial control systems (hereinbelow called blocks) and that the control is effected so that there is no interference at least among the blocks. Here, how to divide the whole object into blocks is, according to the broadest idea of this invention, arbitrary, as long as a block has at least one operation quantity and at least one block has more than two operation quantities or control quantities. When dividing the whole object into blocks, paying attention to characteristics of the object to be controlled and the control quantities, control quantities, which are linked with each other with a close relationship, are grouped together to form a block. A control quantity closely related to a relevant control quantity means a control quantity which is in such a relationship that it is easily influenced by the relevant control quantity when the relevant control quantity is varied. For example, two such control quantities may be control quantities in two parts which are physically, positionally and in time in a close relationship if the object to be controlled. In other words, the blocks are so formed that in the case where a control quantity is varied, variations of the other control quantity or quantities in the relevant block are greater than variations of the control quantities in the other blocks.

Further, the device according to this invention is characterized in that an object to be controlled is divided into a plurality of blocks and there are disposed means for eliminating mutual interference among these blocks and control means for calculating and deciding operation quantities for the object to be controlled for every block.

Still other characteristics of this invention consist in that a control device for controlling an object to be controlled such as a plant, etc., by means of a plurality of control means comprises means for presuming state variables of the object to be controlled depending on operation quantities produced by each of the control means (i.e., a model of the object to be controlled), and means for calculating control deviations by subtracting the presumed state variables from the state variables of the object to be controlled, at least the control deviations stated above being inputted to the control means, on the basis of which the object is controlled.

Furthermore, this invention consists also in a control device, in which in addition to the control deviations described above, the presumed state variables obtained by the presuming means are also inputted to the control means.

By the method according to this invention, since interference is not eliminated uniformly for every control quantity but is eliminated between different blocks, even if the number of control quantities is increased, the number of operations for eliminating the interference is not remarkably increased by choosing appropriately the number of blocks. Further, according to a preferable mode of realization of this invention, since interference is not eliminated uniformly for every control quantity, but control quantities which are closely related to each other are considered all together (in a block), it is not necessary to eliminate interference with a special effort within each of the blocks. That is, performance of useless operations and inefficiency due to an increase in the amount of control operations in eliminating the interference, that the device is complicated, that large control signals (and consequently large mechanical movements at extremities for the operation) are required, etc., can be suppressed. Since by the method according to this invention the elimination of the interference is not effected in the form of 1-input-1-output, but it is effected between different blocks, this invention can be applied in general to any object to be controlled for which the number of inputs (number of operation quantities) differs from the number of outputs (number of control quantities).

Furthermore, by a device according to this invention, since it comprises control means by which control operations are performed in block units for which interference is eliminated, even if the scale of the object to be controlled is enlarged, it is possible to finely divide the control means and also to perform parallel operations among these control means. For this reason, a high speed control and a real time control are made possible.

Still further, according to a mode of realization, since the model of the object to be controlled creates variations of the state quantities of the object to be controlled changed by each of the control means, no interference is produced between different control means because it is possible to control appropriately also state quantities generated by various sorts of factors (external perturbations, etc.) besides the relevant control means by subtracting variations of the state quantities generated by means of the model stated above from the state quantities of the object to be controlled.

BRIEF DESCRIPTION OF THE DRAWINGS

FIG. 3 is a diagram showing a calculation formula in the form of a matrix used in the embodiment of this invention;

FIG. 5 is a diagram indicating state equations in the form of matrices of an object to be controlled in the embodiment of this invention;

FIG. 6 is a diagram indicating the internal structure of the optimum control system in the embodiment of this invention;

FIG. 13 is a diagram illustrating the general construction of this invention for achieving the elimination of interference between different blocks, for which the object to be controlled is divided into a plurality of blocks;

FIGS. 14 and 15 show operations performed in the control in FIG. 13 in the form of matrices;

FIG. 16 is a diagram showing relations among the object to be controlled, the non-interference control system and the optimum control system of this invention for achieving the elimination of interference between different blocks, for which the object to be controlled is divided into a plurality of blocks;

FIGS. 20A and 20B are diagrams for explaining the principle of this invention for suppressing interference among a plurality of control systems having different functions;

FIG. 22 is a diagram showing another example of the general construction of this invention for suppressing interference among a plurality of control systems having different functions.

DESCRIPTION OF THE PREFERRED EMBODIMENTS

Hereinbelow this invention will be explained more specifically.

Figure 1:
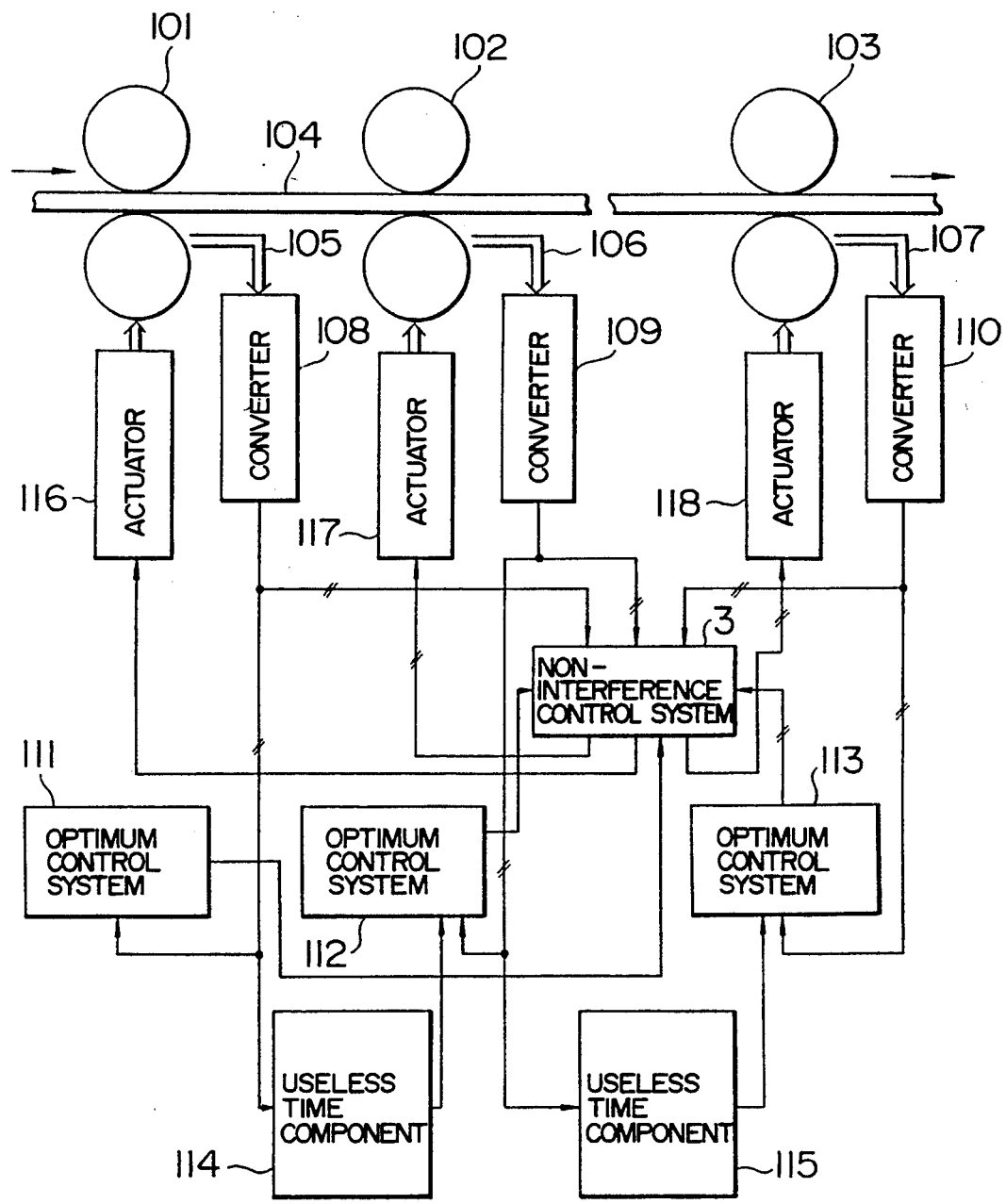
FIG. 1 is a diagram illustrating a control system for a tandem rolling mill which is an embodiment of this invention.

FIG. 1 shows a case where this invention is applied to the control of a tandem rolling mill. In the figure, each of a plurality of rolling stands is represented by a pair of rollers 101, 102, 103 and rolled material 104 is moved in the direction indicated by an arrow in the figure while being rolled by the pairs of rollers. State variables 105, 106, 107 of the pairs of rollers are inputted to a non-interference control system 3, optimum control systems 111, 112, 113, and useless time components 114, 115 through converters 108, 109, 110 effecting processings such as unification of units, etc. The useless time components take the time necessary for the rolled material to move from a certain stand to the succeeding one into account and reflect this time in the control. The outputs thereof are inputted to the optimum control systems 112, 113. The outputs of the optimum control systems 111, 112, 113 are inputted to the non-interference control system 3 stated above. The output of the non-interference control system 3 is inputted to actuators 116, 117, 118. Each of these actuators includes a roller speed control system, a roller position control system, etc., and the control is effected by means thereof with a desired precision so that the rolled material 104 has a desired plate thickness.

Figure 2:
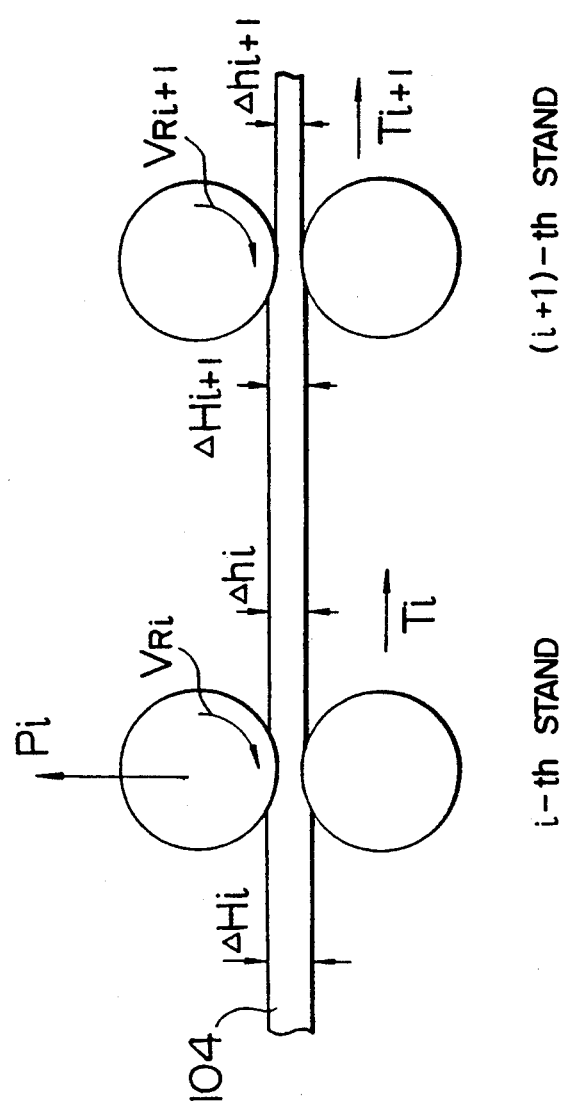
FIG. 2 is a diagram indicating variables at the i-th and (i+1)-th stands of the tandem rolling mill.

In this embodiment the control system of such a tandem rolling mill is divided into a plurality of blocks and a non-interference control is effected between different blocks. Therefore, at first, a linear model of the rolling mill, which is the object to be controlled, is obtained. As indicated in FIG. 2, the i-th and (i+1)-th stands counted from the inlet side of the tandem rolling mill are considered here.

In order to obtain the linear model, the plate outlet thickness deviation, the roller gap, the rolling load deviations, the forward slip deviation, the tension deviation, the rolling speed deviation, mass flows, and the rolling speed (plate speed) are represented by numerical values as follows.

The plate outlet thickness deviation $\Delta h_i$ can be represented by the following Eq. (1), using the gauge meter equation:

$$\Delta h_i = \Delta S_i + \frac{\Delta P_i}{K_i} \qquad (1)$$

where
$\Delta h_i$: plate outlet thickness deviation
$\Delta S_i$: roller gap deviation
$\Delta P_i$: rolling load deviation
$K_i$: elastic modulus deviation
i: i-th stand The roller gap is represented by an output of the roller position control device. For the sake of simplicity, assuming that the control quantity of roller position is a 1-st order lagging system, the following Eq. (2) is valid:

$$\frac{d\Delta S_i}{dt} = \frac{-K_{si}}{T_{si}} \{\Delta S_i - \Delta S_{Pi}\} \qquad (2)$$

where
$\Delta S_{Pi}$: roller gap deviation
$T_{si}$: time constant of the roller position control device
$K_{si}$: gain of the roller position control device The rolling load deviation can be expressed by the following Eq. (3) by performing a Taylor expansion of Hill's approximation formula of the rolling load and obtaining only 1st order differentiation terms to linearize it:

$$\Delta P_i = \frac{\partial P_i}{\partial H_i} \Delta H_i + \frac{\partial P_i}{\partial h_i} \Delta h_i + \frac{\partial P_i}{\partial T_{fi}} \Delta T_{fi} + \frac{\partial P_i}{\partial T_{bi}} \Delta T_{bi} \qquad (3)$$

$$= \frac{\partial P_i}{\partial H_i} \Delta H_i + \frac{\partial P_i}{\partial h_i} \Delta h_i + \frac{\partial P_i}{\partial T_{fi}} \Delta T_i + \frac{\partial P_i}{\partial T_{bi}} \Delta T_{bi}$$

$P_i$: rolling load formula,
$H_i$: plate inlet thickness,
$\Delta H_i$: plate inlet thickness deviation,
$h_i$: plate outlet thickness, $T_{fi}(=T_i)$: forward tension,
$\Delta T_{fi}(=\Delta T_i)$: forward tension deviation,
$T_{bi}(=T_{i-1})$: back tension,
$\Delta T_{bi}$: back tension deviation.

The forward slip deviation $\Delta f_i$ can be obtained from a forward slip formula $f(H_i, h_i, T_{fi}, T_{bi})$ and the following Eq. (4) is valid:

$$\Delta f_i = \frac{\partial f_i}{\partial H_i} \Delta H_i + \frac{\partial f_i}{\partial h_i} \Delta h_i + \frac{\partial f_i}{\partial T_{fi}} \Delta T_{fi} + \frac{\partial f_i}{\partial T_{bi}} \Delta T_{i-1} \quad (4)$$

From the tension formula the following Eq. (5) is obtained:

$$\frac{d\Delta T_i}{dt} = \frac{-Ebh_i}{L}(\Delta V_{ei+1} - \Delta V_{0i}) \quad (5)$$

where
E: Young's modulus of the rolled material,
b: plate width of the rolled material,
L: distance between the i-th and (i+1)-th stands,
$\Delta V_{ei+1}$: plate speed at the inlet side of the (i+1)-th stand,
$V_{0i}$: plate speed at the outlet side of the i-th stand.

When it is assumed that the speed control is a first order lag system, its differential equation is represented by the following Eq. (6):

$$\frac{d\Delta V_{Ri}}{dt} = \frac{-K_{Vi}}{T_{Vi}}(\Delta V_{Ri} - \Delta V_{Pi}) \quad (6)$$

where
$\Delta V_{Ri}$: deviation in the roller speed,
$T_{Vi}$: time constant,
$K_{Vi}$: gain, and
$\Delta V_{pi}$: instruction deviations in the roller speed.

From the mass flow formula the following Eq. (7) is obtained:

$$\Delta V_{ei+1} = \frac{1}{H_{i+1}}(h_{i+1}\Delta V_{0i} + V_{0i+1}\Delta h_{i+1} - V_{ei+1}\Delta H_{i+1}) \quad (7)$$

The following Eq. (8) is obtained by performing a Taylor expansion of the plate speed formula and taking only the first order differential terms:

$$\Delta V_{0i} = V_{Ri}\Delta f_i + (1+f_i)\Delta V_{Ri} \quad (8)$$

Here, if the i-th stand is regarded as an independent control system, denoting a vector (state vector), whose elements are state variables representing the internal state thereof, by $x_i$ and a vector (operation vector), whose elements are the inputs, by $u_i$, $x_i$ and $u_i$ can be expressed as follows, respectively:

$$x_i = [\Delta h_i, \Delta V_{Ri}, \Delta T_i]^T \quad u_i = [\Delta S_{pi}, \Delta V_{pi}]^T$$

Using these expressions, it is will now be attempted to rearrange Eqs. (1) to (8) to express them in the form of differential equations.

At first, starting from Eqs. (1) to (3), the following Eq. (9) is obtained:

$$\frac{d\Delta h_i}{dt} = \frac{d\Delta S_i}{dt} = \frac{-K_{Si}}{T_{Si}}\left(\Delta h_i - \frac{\Delta P_i}{K_i} - \Delta S_{pi}\right) \quad (9)$$

-continued $$= \frac{-K_{Si}}{T_{Si}}\left\{\left(1 - \frac{\partial P_i}{\partial h_i}\right)\Delta h_i - \frac{\partial P_i}{\partial T_{fi}}\Delta T_i - \frac{\partial P_i}{\partial T_{bi}}\Delta T_{i-1} - \Delta S_{Pi} - \frac{\partial P_i}{\partial H_i}\Delta H_i\right\}$$

$$= \left[-\frac{K_{Si}}{T_{Si}}\left(1 - \frac{\partial P_i}{\partial h_i}\right), 0, \frac{K_{Si}}{T_{Si}}\frac{\partial P_i}{\partial T_{fi}}x_i\right] +$$

$$\left[0, 0, \frac{K_{Si}}{T_{Si}}\frac{\partial P_i}{\partial T_{fi}}\right]x_{i-1} + \left[\frac{K_{Si}}{T_{Si}}, 0\Delta u_i\right] +$$

$$\frac{\partial P_i}{\partial H_i}\Delta H_i$$

Then, transforming Eq. (6), the following Eq. (10) is obtained:

$$\frac{d\Delta V_{Ri}}{dt} = \left[0, \frac{-K_{Vi}}{T_{Vi}}, 0\right]x_i + \left[0, \frac{K_{Vi}}{T_{Vi}}\right]u_i \quad (10)$$

Starting from Eqs. (4), (5), (7) and (8), the following Eq. (11) is obtained:

$$\frac{d\Delta T_i}{dt} = \frac{Ebh_i}{L}\left[\frac{1}{H_{i+1}}(h_{i+1}\Delta V_{0i+1} + V_{0i+1}\Delta h_i - V_{ei}\Delta H_{i+1} - V_{ei}\Delta H_{i+1}) - \Delta V_{0i}\right] \quad (11)$$

$$= \left[\frac{Ebh_i}{LH_{i+1}}\left(h_{i+1}V_{Ri+1}\frac{\partial f_{i+1}}{\partial h_{i+1}} + V_{0i+1}\right),\right.$$

$$\frac{Ebh_i h_{i+1}}{LH_{i+1}}(1+f_{i+1}),$$

$$\left.\frac{Ebh_i h_{i+1}}{LH_{i+1}}V_{Ri+1}\frac{\partial f_{i+1}}{\partial T_{fi+1}}\right]x_{i+1} +$$

$$\left[-\frac{Ebh_i}{L}V_{Ri}\frac{\partial f_i}{\partial h_i}, \frac{-Ebh_i}{L}(1+f_i),\right.$$

$$\left.\frac{Ebh_i}{L}\left(\frac{h_{i+1}}{H_{i+1}}V_{Ri+1}\frac{\partial f_{i+1}}{\partial T_{bi+1}} - V_R\frac{\partial f_i}{\partial T_{bi}}\right)\right]x_i +$$

$$\left[0, 0, -\frac{Ebh_i}{L}V_{Ri}\frac{\partial f_i}{\partial T_{bi}}\right]x_{i-1} +$$

$$\frac{Ebh_i}{L}\left(V_{Ri+1}\frac{\partial f_{i+1}}{\partial H_{i+1}} - \frac{V_{ei+1}}{\partial H_{i+1}}\right)\Delta H_{i+1} -$$

$$\frac{Ebh_i}{L}V_{Ri}\frac{\partial f_i}{\partial H_i}\Delta H_i$$

Eqs. (9) to (11) express explicitly in the form of differential equations the relationships among the plate outlet thickness deviation $\Delta h_i$, the roller speed deviation $\Delta V_{Ri}$ and the forward tension deviation $\Delta T_i$, which are control quantities, as well as the roller gap deviation $\Delta S_{Pi}$ and the roller speed deviation $\Delta V_{Pi}$, which are operation quantities, in this embodiment.

Taking a three-stand tandem mill as an example, these relationships are described in the form of a matrix as indicated in FIG. 3. In the figure, the terms of the two members in (A) and (B) correspond to each other. In (A) of FIG. 3, $a_{ij}$, $b_{ij}$ and $d_{ij}$ are coefficients for the variables in Eqs. (9) to (11). For example, in Eq. (10);

$$\frac{-K_{Vi}}{T_{Vi}}$$

in the first term of the right member is $$\frac{K_{V2}}{T_{V2}}$$

if i=2, which corresponds to $a_{55}$ in (A) of FIG. 3. In the same way, $$b_{44} = \frac{K_{V2}}{T_{V2}}.$$

The third term in the right member can be understood as a measurable external perturbation.

According to the idea of this invention, the state equation indicated in the figure is divided into a plurality of blocks, each of which includes at least one operation quantity, so that the blocks mutually have no interference. This is because in the case of this embodiment, it is desirable that a specific dividing method is defined for every stand. Contrary to the fact that two different stands are related mutually to each other only by the rolled material connecting them, i.e. the rolling tension, within one stand not only the tension but also the plate thickness and the rolling speed are related mutually, and thus the control quantities are related more closely than between different stands. Referring to FIG. 3, it can be seen that the tension is the only state quantity relating the two different stands. For example, the terms having influences from the second stand to the first stand are $a_{34}$, $a_{35}$ and $a_{36}$, all of which are related to the tension deviations $\Delta T_1$ and $\Delta T_2$. On the other hand, considering the interior of the first stand, it is found that there exist terms of $a_{11}$, $a_{13}$, $a_{22}$, $a_{31}$, $a_{32}$, and $a_{33}$, which are related to each other over all of $\Delta h_1$, $\Delta V_{R1}$, and $\Delta T_1$.

Now a specific method for eliminating the interference between different stands represented by the first term of the right member (system matrix A) in FIG. 3 will be explained, taking the second stand as an example.

When the state equations related to the second stand are extracted from those indicated in FIG. 3, the following Eqs. (12) to (14) are obtained:

$$\frac{d\Delta h_2}{dt} = a_{43}\Delta T_1 + a_{44}\Delta h_2 + a_{46}\Delta T_2 + b_{33}\Delta S_{P2} + d_{43}\Delta H_2 \quad (12)$$

$$\frac{d\Delta V_{R2}}{dt} = a_{55}\Delta V_{R2} + b_{44}\Delta V_{P2} \quad (13)$$

$$\frac{d\Delta T_2}{dt} = a_{63}\Delta T_1 + a_{64}\Delta h_2 + a_{65}\Delta V_{R2} + a_{66}\Delta T_2 + a_{67}\Delta h_3 + \quad (14)$$

-continued
$$a_{68}\Delta V_{R3} + a_{69}\Delta T_3 + d_{54}\Delta H_3 + d_{53}\Delta H_2$$

The terms, in which the suffix of the variables is 1 or 3, i.e. terms indicated by underlines in Eqs. (12) and (14), are terms representing interference from other stands and the elimination of the interference can be achieved by annulling these terms.

Figure 4:
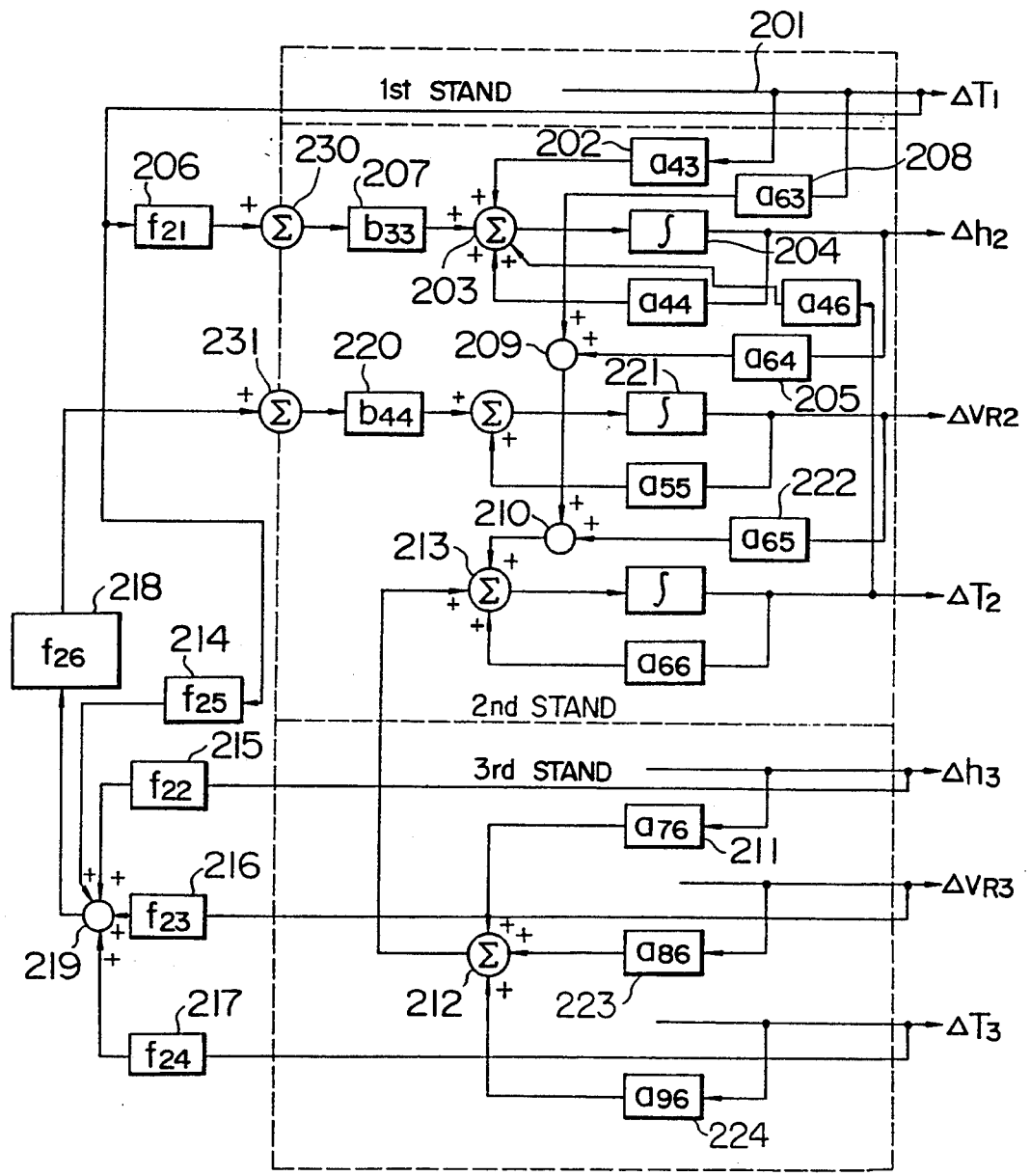
FIG. 4 is a diagram illustrating the construction of a control system for the elimination of interference between different blocks in the embodiment of this invention.

FIG. 4 indicates such a control system for eliminating the interference. Each of the interference terms will be explained below.

The tension deviation $\Delta T_1$ 201 of the first stand is inputted to an adder 203 through a block $a_{43}$ 202, as indicated by the first term of the right member in Eq. (12). Here "block $a_{43}$" means "an amplifier having a gain represented by $a_{43}$", for example. The output of the adder 202 is integrated by an integrator 204 to form the plate thickness deviation $\Delta h_2$ 205. As a gain summing the feed back and the feed forward for eliminating the interference, $\Delta T_1$ 201 is inputted to a control matrix 207 as the input through a non-interference gain $f_{21}$ 206 and an adder 230. The output of this control matrix 207 is applied to the adder 203 and the elimination of the interference is achieved if the output of this adder 203 includes no component of $\Delta T_1$. That is, starting from the condition:

$$b_{33} \times f_{21} \times \Delta T_1 + a_{43} \times \Delta T_1 = 0,$$

it can be understood that it is sufficient to choose a gain represented by:

$$f_{21} = -\frac{a_{43}}{b_{33}}.$$

Now the method for annulling the interference terms indicated by underlines in Eq. (14) will be explained below.

The tension deviation $\Delta T_1$ of the first stand is inputted to an adder 210 through a block $a_{63}$ 208 and an adder 209. The plate thickness deviation $\Delta h_3$ of the third stand is inputted to an adder 212 through a block $a_{76}$ 211; the deviations in the speed $\Delta V_{R3}$ to the adder 212 through a block $a_{86}$ 223; the deviations in the tension $\Delta T_3$ to the adder 212 through a block $a_{96}$ 224; and the outputs of the adders 210 and 212 are inputted to an adder 213.

On the other hand, in this embodiment, blocks $f_{25}$ 214, $f_{22}$ 215, $f_{23}$ 216, $f_{24}$ 217 and $f_{26}$ 218 are used in order to eliminate the interference. $\Delta T_1$ is inputted to an adder 219 through the block $f_{25}$ 214, whose gain is $a_{63}$; $\Delta h_3$ to the adder 219 through the block $f_{22}$ 215, whose gain is $a_{76}$; $\Delta V_{R3}$ to the adder 219 through the block 216, whose gain is $a_{86}$; $\Delta T_3$ to the adder 219 through the block $f_{24}$ 217, whose gain is $a_{96}$; and the output of the adder 219 to a block 220 through a block 218 and an adder 231 as the instruction deviation in the speed. The output of the block 220 is inputted to the adder 213 through an integrator 221, a block 222 and the adder 210.

If the gain of the block $f_{26}$ is the inverse of the transmission function up to the integrator 221, the blocks 220, 222 and the adder 210, 213, i.e.

$$f_{26} = \frac{S - a_{55}}{b_{44} \cdot a_{65}}$$

the equivalent gain from the adder 219 to the adder 213 is −1. Consequently, the influences of $\Delta T_1$, $\Delta h_3$, $\Delta V_{R3}$, and $\Delta T_3$ are compensated by each other and thus the elimination of the interference is valid with respect to the second stand.

By a method similar to that described above, it is possible to eliminate interference for each of the other stands, and thus the elimination of interference between different blocks is made valid by the operation thereof.

Further, for the blocks in which the number of inputs is equal to the number of outputs, if the elimination of interference is effected by regarding each of them as a block of 1-input-1-output, it is possible to realize the elimination of interference between the input and the output of each of them in addition to the elimination of interference between different blocks.

The state equation of the object to be controlled (including a non-interference control system) for which such a structure is adopted will be explained below referring to FIG. 5. It is expressed as an object to be controlled by a block 160 by using relations shown in a block 150 representing states of different stands of the rolling mill and divided into three state equations as shown in a block 170 by decomposing each of the blocks $A_1$, $A_2$, $A_3$, $B_1$, $B_2$ and $B_3$ and rearranging them. In this case, since each of the state equations is of the third order, an effect can be obtained that the optimum control (stated later) can be realized only by a simple $3 \times 3$ matrix calculation.

Now, on the assumption that the elimination of interference between different blocks has been achieved, a case where so-called optimum control is applied to the control of the rolling mill in this embodiment will be explained. Optimum control means a control method by which deviations in the state quantities and the operation quantities, and the operation quantities themselves, are minimized by regulating them appropriately. Since control is effected while also taking the internal structure of the object to be controlled into account, contrary to the conventional prior art control system in which attention is paid only to the relation between the input and the output, an effect thereof on the improvement of characteristics is expected.

In this embodiment, as an example, the optimum control system 112 controlling the 2nd stand 102 in FIG. 1 will be explained. The optimum control system 112 receives the state vector X and the measurable external perturbation W and performs predetermined operations (stated later). The result thus obtained is added to the operation result stated previously for eliminating the interference in the non-interference control system 3 and in this way an actuator 117 of the 2nd stand is controlled.

FIG. 6 indicates the internal structure of the optimum control system. In the figure, reference numeral 102 represents the 2nd stand which is the object to be controlled. As described previously, $\Delta S_{P2}$ and $\Delta V_{P2}$ are operation quantities and $\Delta h_2$, $\Delta V_{R2}$ and $\Delta T_2$ are control quantities (state quantities). $\Delta h_2$ is applied to an adder 251 through $F_{11}$ 250; $\Delta V_{R2}$ to the adder 251 through $F_{12}$ 252; and $\Delta T_2$ to the adder 251 through $F_{13}$ 253. Here $F_{ij}$ represent feed back parameters obtained by the logic of the optimum control system. The output of the adder 251 is inputted to an adder 254.

In the same way, $\Delta h_2$ is inputted to an adder 256 through $F_{21}$ 255; $\Delta V_{R2}$ to the adder 256 through $F_{23}$ 257; and $\Delta T_2$ to the adder 256 through $F_{23}$ 258. The output of the adder 256 is inputted to an adder 259.

The measurable external perturbation $W_2$ is e.g. deviations in the plate thickness on the inlet side $\Delta H_i$ in the embodiment stated above and it is inputted to the adder 254 through $m_1$ 270 and to the adder 259 through $m_2$ 271. $m_i$ are feed forward parameters obtained by the logic of the optimum control system.

Figure 7A:
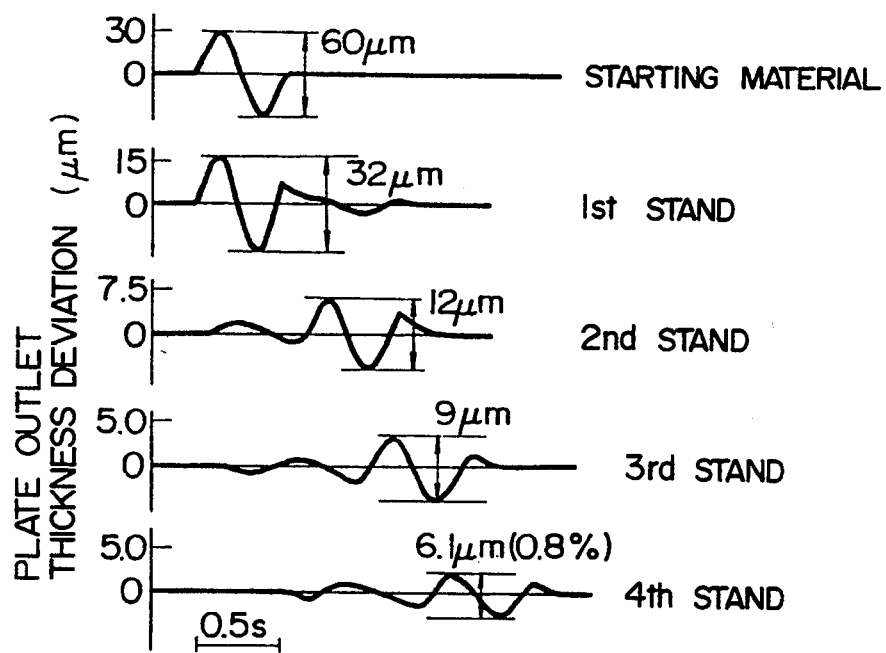
FIG. 7A shows graphs representing simulation results obtained by the prior art control method for a rolling mill.

Here a simulation result indicating the effect of this embodiment will be explained. This simulation is performed concerning the plate outlet thickness deviations obtained in the case where a steel plate is rolled by a 4-stand tandem rolling mill. The simulation conditions are that the plate thickness before rolling (plate thickness of the starting material) is 2.8 mm, that the plate thickness after rolling (finishing plate thickness) is 0.8 mm, and that the rolling speed is 1000 m/min. An external perturbation of 60 $\mu$m in the thickness is superposed on the starting material. That is, it is assumed that the starting material has an undulation of 60 $\mu$m in the thickness. FIG. 7A indicates a simulation result according to the gauge meter type AGC (Automatic Gauge Control) by the prior art control method for a rolling mill.

This figure shows the process by which the deviation which is derived from the external perturbation applied to the stand shifts gradually from the 1st stand to the 4th stand. Here the deviation appearing first at the 2nd stand is derived from the tension exerted between the 1st stand and the 2nd stand, when the external perturbation is applied to the 1st stand. The simulation result was that the plate thickness deviation is 6.1 $\mu$m, which is 0.8% of the desired plate thickness.

Figure 7B:
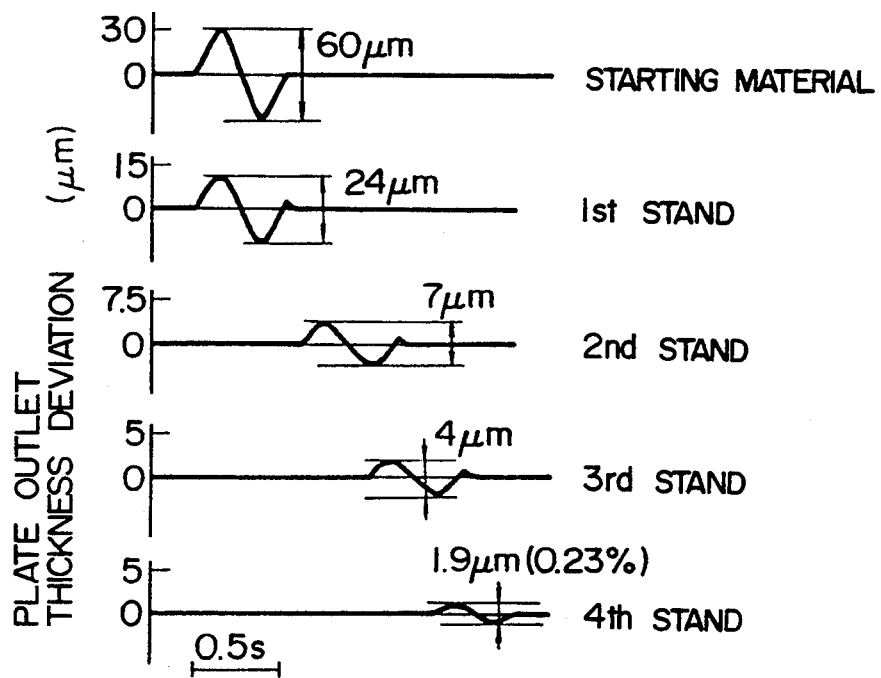
FIG. 7B shows graphs representing simulation results obtained by the embodiment of this invention.

FIG. 7B shows a simulation result by the control method according to this invention which indicates that since the decomposition has been effected in stand units, the influences of the 1st stand on the 2nd stand in FIG. 7A have disappeared. Since the separate control of each of the stands can exhibit satisfactorily its ability, the plate thickness deviation at the last stand is 1.9 $\mu$m, and therefore it can be seen that it is reduced to about $\frac{1}{3}$ of that of the prior art control.

As it can be clearly seen from the comparison of FIG. 7A with FIG. 7B, according to this invention, there are no influences of one stand on another due to the tension between the different stands, and therefore it can be seen that the interference is eliminated separately for every stand.

In this way, when this invention is applied to the control of a tandem mill, in addition to the original effect of this invention, the following effect is obtained. That is, since it is possible to control the stands independently, when the number of stands is changed, since it is sufficient to modify only the relevant stand in order to modify the control device and it is unnecessary to modify the whole system, it becomes easier to handle the control system.

For example, in the case where the number of stands is increased, heretofore it has been necessary to construct a new control system for the whole tandem mill including newly installed stands and therefore a large scale modification is inevitable. On the contrary, by applying this invention thereto, since the interference between different stands is eliminated, it can be carried out to control the whole tandem mill by adding a new control device only for the newly installed stands. Similarly in the case where a certain stand is pulled out of operation as a dummy stand (e.g. at a flying roller change), it is sufficient to remove the function of the part of the control device which is in charge of the control of the relevant stand.

Further, this invention can be applied to a single stand mill. In a single stand mill, e.g. in the case where control quantities are $\Delta h$, $\Delta V_R$ and $\Delta T$, it can be divided into a block whose control quantity is $\Delta h$, and a block whose control quantities are $\Delta V_R$ and $\Delta T$. In this case, since it is possible to divide operation and control quantities into blocks and to eliminate interference therebetween regardless of many or few quantities, there are effects that the freedom for the control of the rolling mill is increased and that nigh precision control is made possible.

Now another embodiment of this invention will be explained. In this embodiment, it is aimed to suppress undesired interference between the non-interference control means for eliminating interference between different blocks and the optimum control means for controlling each block.

In this embodiment, variations in the state quantities due to the non-interference control between different stands of a tandem rolling mill are presumed by using control outputs and a model of the object to be controlled and are subtracted from variations in the state quantities of the object to be controlled in order to perform the optimum control.

Figure 8:
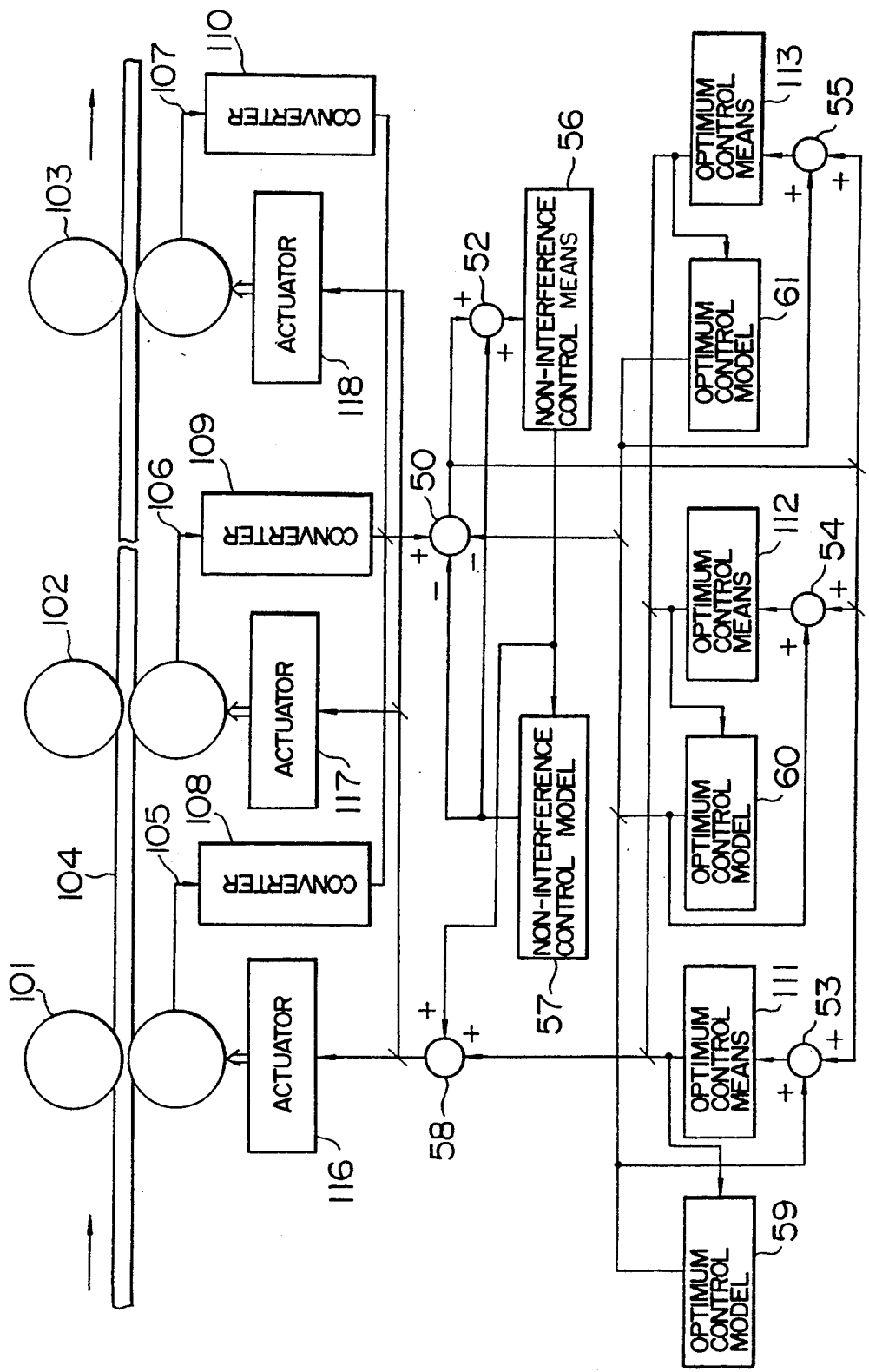
FIG. 8 is a diagram illustrating a control system for a tandem rolling mill which is another embodiment of this invention.

In FIG. 8, the items equivalent to those indicated in FIG. 1 are indicated by the same reference numbers as those in FIG. 1 and explanation thereof will be omitted. In FIG. 8, the outputs of converters 108, 109 and 110 are inputted to an adder 50. The output of the adder 50 is inputted to adders 52, 53, 54 and 55. The output of the adder 52 is inputted to non-interference control means 56 for eliminating influences of the stands on each other as described previously. The output of the non-interference control means 56 is inputted to a non-interference control model 57 and an adder 58. The output of the non-interference control model 57 is inputted to the adder 50 as a quantity to be subtracted and to the adder 52 as a quantity to be added. The outputs of the adders 53, 54 and 55 are inputted to optimum control means 111, 112 and 113, respectively, as state feed back quantities. The optimum control means 111, 112 and 113 determine operation quantities for actuators 116, 117 and 118, respectively, corresponding to the fed back state, which quantities are inputted to the actuators 116, 117 and 118 through an adder 58 and to optimum control models 59, 60 and 61, respectively.

In this case, the adder 58 does not consist of one adder, but of adders producing instructions corresponding to different actuators, such as an adder for producing a speed instruction for the actuator 116 by adding a speed instruction from the optimum control means 111 for the actuator 116 to a speed instruction from the non-interference control means 56 for the actuator 116, etc. (refer to FIG. 12). The optimum control models 59 60 and 61 are models of the object to be controlled, which are used for obtaining feed back constants for the optimum control means 111, 112 and 113, respectively. The outputs of these optimum control models are inputted to the adder 50. As described above, the adder 50 obtains control deviations by subtracting the state quantities presumed by the non-interference control model 57 as well as by the optimum control models 59, 60 and 61 from the state quantities of the pairs of rollers 101, 102 and 103 which are objects to be controlled.

In FIG. 8, a plurality of signal lines are expressed by one line. Here a  mark represents a branching of the signal lines and a mark  represents simply gathering or separating the signal lines.

Figure 9:
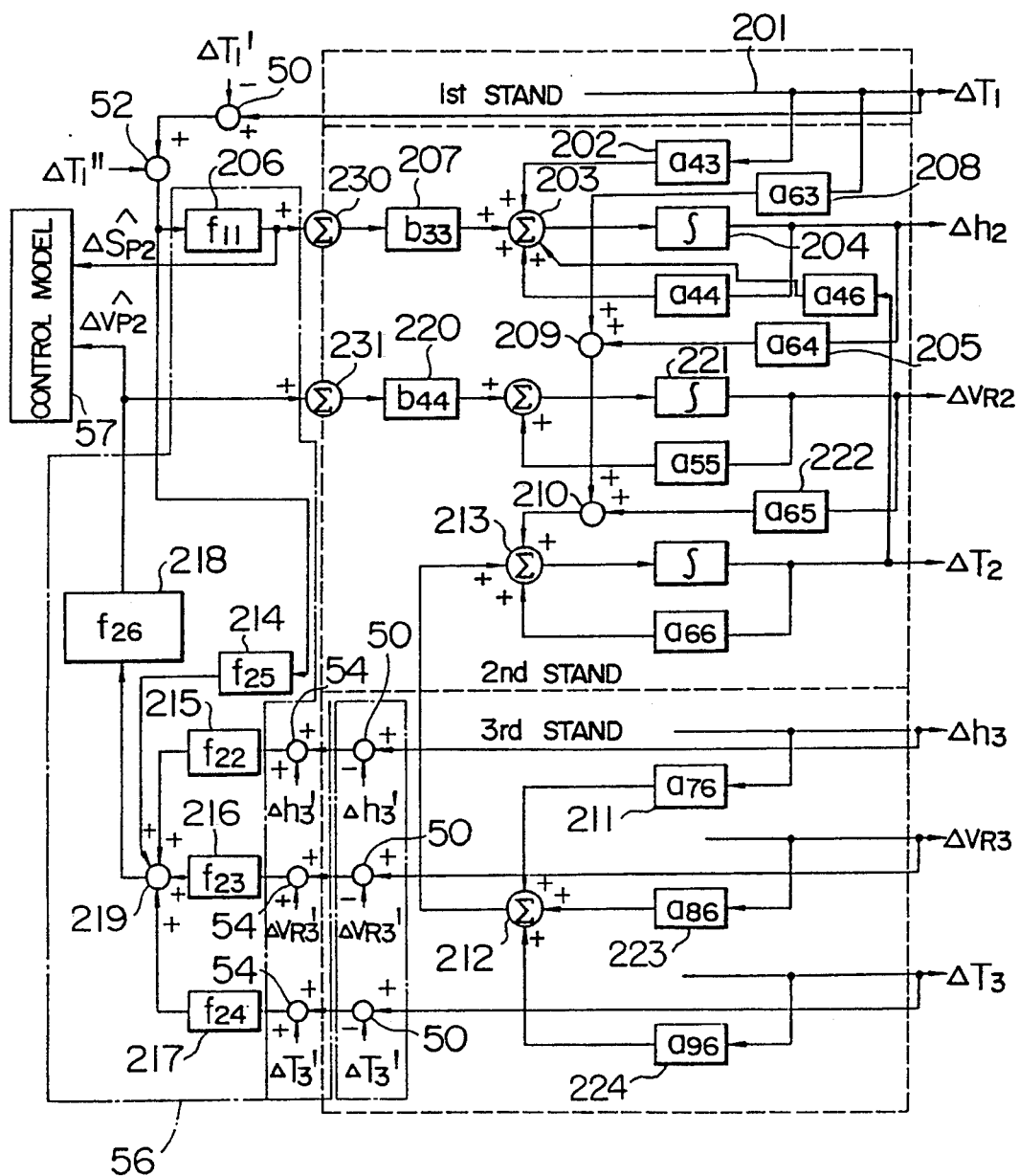
FIG. 9 is a diagram illustrating a non-interference control system in the other embodiment of this invention.

FIG. 9 shows a non-interference control system in this embodiment. The items equivalent to those in FIG. 4 are indicated by the same reference numerals as those in FIG. 4.

In FIG. 9, as a gain summing the feed back and the feed forward for eliminating the interference, $\Delta T_1$ 201 is inputted to the control matrix 207 as an input through the adder 50, the adder 52, the non-interference gain $f_{21}$ 206 and the adder 230. $\Delta T_1'$, which is the resultant of the outputs of the models 57 and 59, and $\Delta T_1''$, which is the output of the model 57, are also inputted to the adders 50 and 52, respectively. Further, a speed instruction $\Delta \hat{S}_{P2}$ and a push down instruction $\Delta \hat{V}_{P2}$ for the 2nd block are inputted to the control model 57.

In FIG. 9, the part 56 enclosed by a chain-dotted line corresponds to the non-interference control means 56 indicated in FIG. 8.

Figure 10:
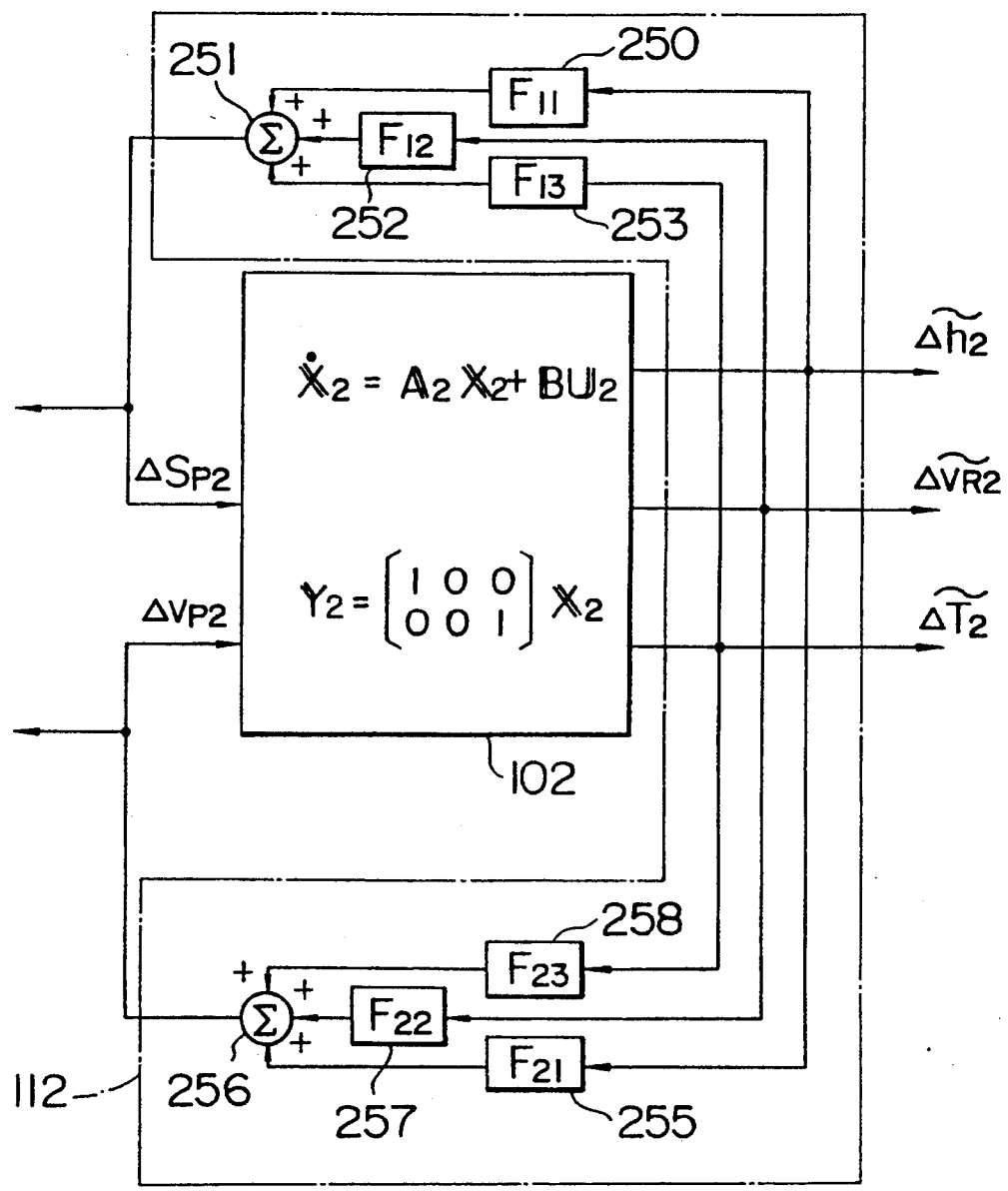
FIG. 10 is a diagram illustrating the internal structure of the optimum control means in the other embodiment of this invention.

FIG. 10 shows the internal structure of the optimum control means 112 in this embodiment. In the figure, reference numeral 102 indicates the second stand, whose operation quantities are $\Delta S_{P2}$ and $\Delta V_{P2}$ and whose control quantities (state quantities) are $\Delta \bar{h}_2$, $\Delta \bar{V}_{R2}$ and $\Delta \bar{T}_2$. $\Delta \bar{h}_2$ is inputted to an adder 251 through $F_{11}$ 250; $\Delta \bar{V}_{R2}$ to the adder 251 through $F_{12}$ 252; and $\Delta \bar{T}_2$ to the adder 251 through $F_{13}$ 253.

The output of the adder 251 is inputted as the push down instruction $\Delta S_{P2}$ of the object to be controlled 102 considered together with an actuator.

Similarly, $\Delta \bar{h}_2$ is inputted to an adder 256 through $F_{21}$ 255; $\Delta \bar{V}_{R2}$ to the adder 256 through $F_{22}$ 257; $\Delta \bar{T}_2$ to the adder 256 through $F_{23}$ 258; and the output of the adder 256 is inputted as the speed instruction $\Delta V_{P2}$ of the object to be controlled 102 stated above. These parts concerning the optimum control enclosed by the chain-dotted line constitute optimum control means 112.

Figure 11:
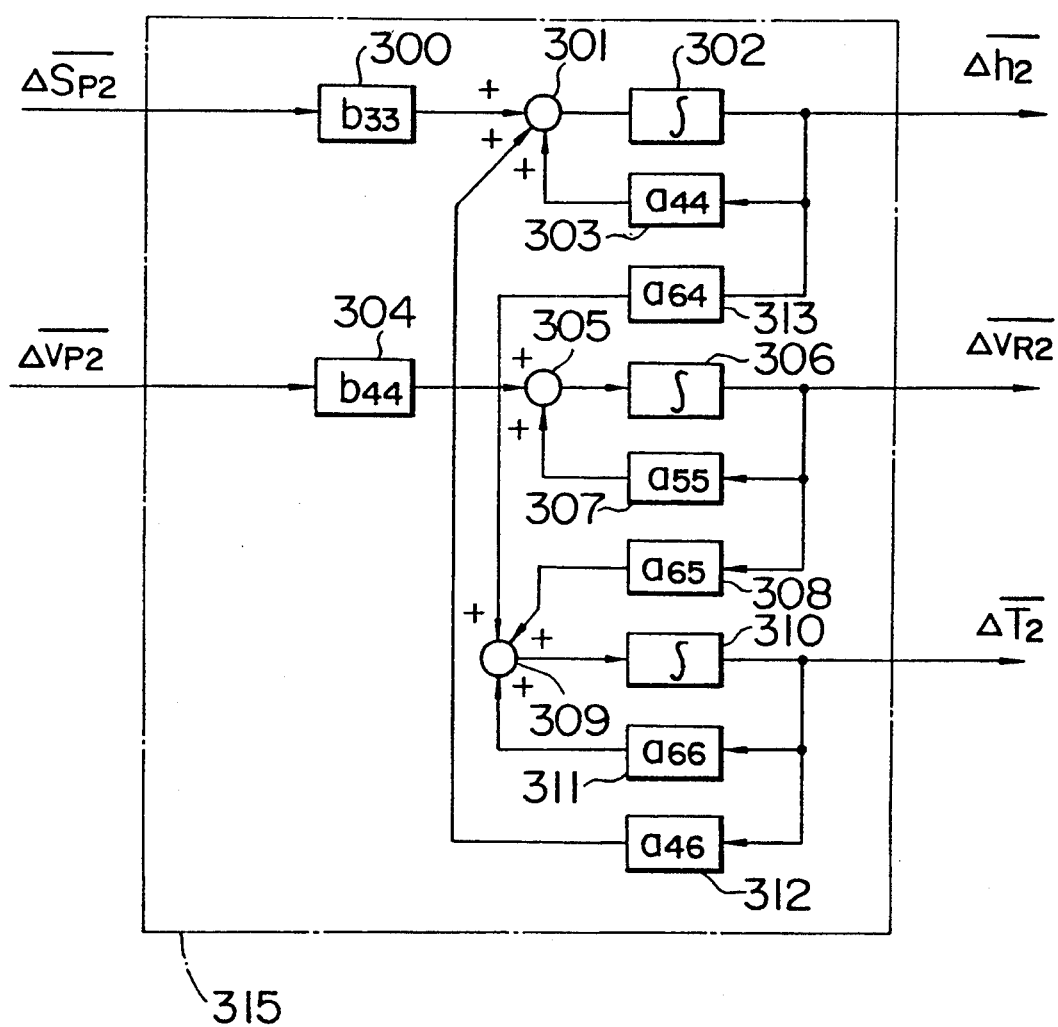
FIG. 11 is a diagram illustrating the internal structure of the model of the object to be controlled in the other embodiment of this invention.

Now FIG. 11 illustrates the construction of a model of the object to be controlled as an example of the non-interference control model 57 as well as the optimum control models 59, 60 and 61. This model is constructed on the basis of the state equations (12) to (14) stated previously, in which as the operation quantities at that time $\Delta S_{P2}$ is changed to $\Delta \overline{S_{P2}}$ and $\Delta V_{P2}$ to $\Delta \overline{V_{P2}}$ as well as the state quantities $\Delta h_2$ being changed to $\Delta \bar{h}_2$; $\Delta V_{R2}$ to $\Delta \bar{V}_{R2}$; and $\Delta T_2$ to $\Delta \bar{T}_2$.

In FIG. 11, the operation quantity $\Delta \overline{S_{P2}}$ is an element of the operation matrix and it is applied to an adder 301 through a block $b_{33}$ 300. A signal, which is the outout of the adder 301 and the differential value of $\overline{\Delta h_2}$, is the presumed value $\overline{\Delta h_2}$ of the deviations in the plate thickness through an integrator 302. This $\overline{\Delta h_2}$ is applied to the adder 301 through a block $a_{44}$ 303. The speed instruction $\Delta \overline{V_{P2}}$ is applied to an adder 305 through a block $b_{44}$ 304. The output of the adder 305 is the presumed value of the roller peripheral speed deviation $\Delta \overline{V_{R2}}$ through an integrator 306. This $\Delta \overline{V_{R2}}$ is applied to the adder 305 through a block $a_{55}$ 307 and at the same time to another adder 309 through a block $a_{65}$ 308. The output of the adder 309 is the presumed value of the tension deviation $\Delta \overline{T_2}$ through an integrator 310. This $\Delta \overline{T_2}$ is applied to the adders 309 and 301 through blocks $a_{66}$ 311 and $a_{46}$ 312, respectively. Further, the presumed value of the plate thickness deviation $\Delta \overline{h_2}$ is applied to the adder 309 through a block $a_{64}$ 313. All of these blocks constitute a model 315.

A specific method for eliminating the interference of the non-interference control means and the optimum control means will be explained, referring to FIG. 12. Here the 2nd stand is considered just as in the explanation described above.

Figure 12:
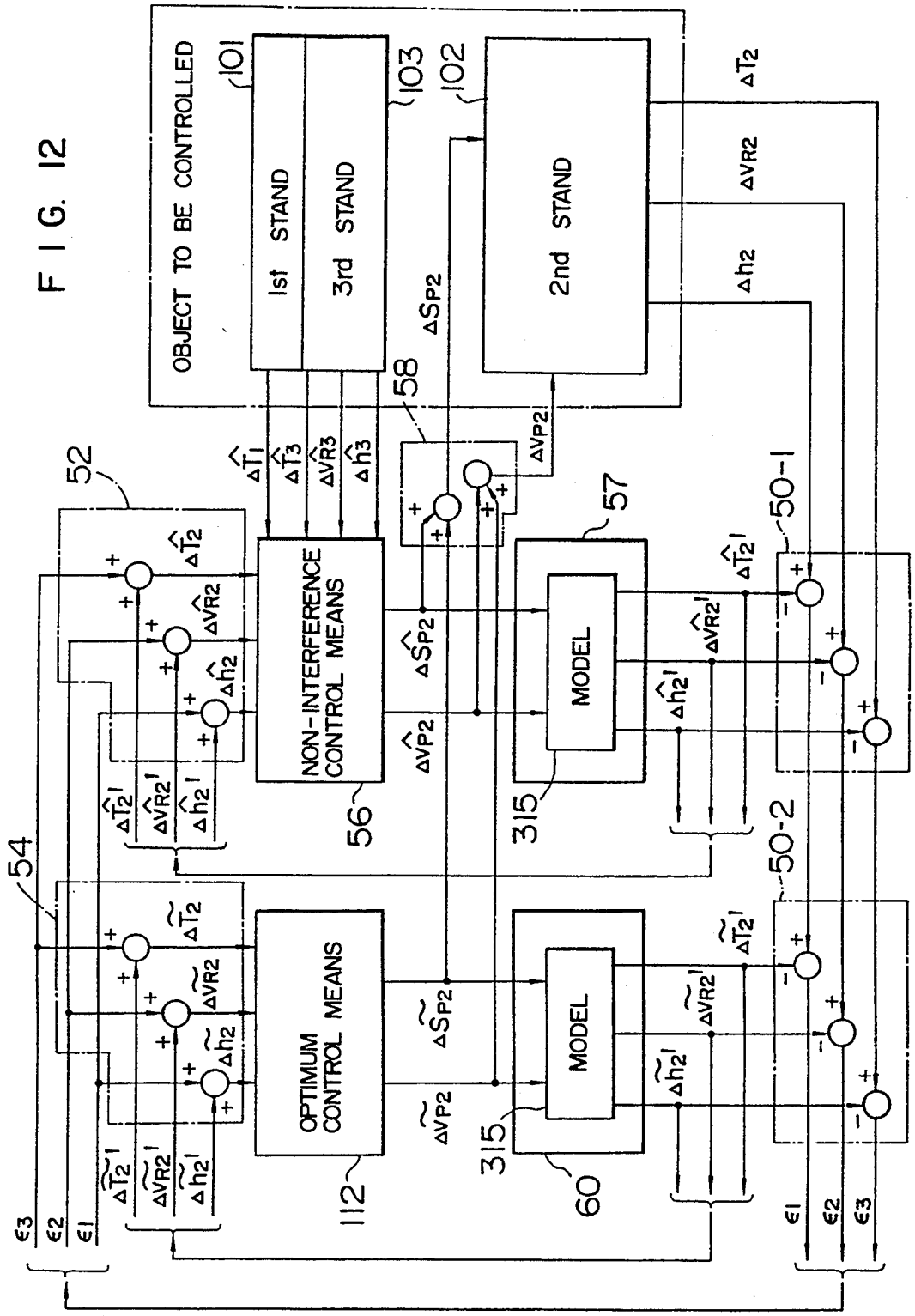
FIG. 12 is a diagram illustrating the construction of the control system for eliminating interference between different control systems in the other embodiment of this invention.

In FIG. 12, the presumed state quantities $\Delta\hat{h}_2$, $\Delta\hat{V}_{R2}$, and $\Delta\hat{T}_2$, of a non-interference control model 57 are subtracted from the state quantities $\Delta h_2$, $\Delta V_{R2}$ and $\Delta T_2$ of the 2nd stand 102, which is the object to be controlled, respectively, in an adder 50-1 and further the presumed state quantities $\Delta\bar{h}_2'$, $\Delta\bar{V}_{R2}'$ and $\Delta\bar{T}_2'$ of an optimum control model 60 are subtracted therefrom in an adder 50-2 to obtain the plate thickness deviation $E_1$, the roller peripheral speed deviation $E_2$ and the tension deviation $E_3$, respectively. The state quantities $\Delta\bar{h}_2'$, $\Delta\bar{V}_{R2}'$ and $\Delta\bar{T}_2'$ presumed by the non-interference control model 57 are added to these control deviations $E_1$, $E_2$ and $E_3$, respectively, in an adder 52 to be the state quantities $\Delta\bar{h}_2$, $\Delta\bar{V}_{R2}$ and $\Delta\bar{T}_2$ fed back to the non-interference control means 56. The outputs of the non-interference control means 56 are a push down instruction $\Delta\hat{S}_{P2}$ and a speed instruction $\Delta\hat{V}_{R2}$, which are operation quantities for the object to be controlled and which are inputted to the non-interference control model 57 and an adder 58 generating instruction values.

In the same way the state quantities $\Delta\bar{h}_2'$, $\Delta\bar{V}_{R2}'$ and $\Delta\bar{T}_2'$ presumed by the optimum control model 60 stated above (in this case the 2nd stand) are added to the control deviations $E_1$, $E_2$ and $E_3$ described previously in an adder 54 to obtain the state quantities $\Delta\bar{h}_2$, $\Delta\bar{V}_{R2}$ and $\Delta\bar{T}_2$ applied to the optimum control means 112. The optimum control means 112 performs operations indicated in FIG 10 to obtain the push down instruction $\Delta\bar{S}_{P2}$ and the speed instruction $\Delta\bar{V}_{P2}$, which are inputted to the optimum control model 60 and the adder 58. The outputs of the adder 58 are $\Delta S_{P2}$ and $\Delta V_{P2}$, which are operation quantities for the 2nd stand and which are inputted to the roller position control system and the speed control system. respectively.

Here the non-interference control model 57 and the optimum control model 60 are constituted by the model of object to be controlled 315 indicated in FIG. 11.

In such a construction, if e.g. the plate thickness the tension and the roller peripheral speed of the 3rd stand vary, the non-interference control means 56 indicated in FIG. 12 outputs an instruction to the roller peripheral speed instruction $\Delta\hat{V}_{P2}$ through the feed back gain $f_{26}$ 218 indicated in FIG. 9 so as to compensate for influences of the plate thickness, the tension and the roller peripheral speed of the 3rd stand stated above. Receiving this instruction, the 2nd stand 102, which is the object to be controlled, varies its roller peripheral speed and is operated so as to compensate for influences on the tension $\Delta T_2$, which is a state quantity. As a result, deviations in the quantities necessary for realizing the elimination of the interference take place in the state quantities $\Delta h_2$, $\Delta V_{R2}$ and $\Delta T_2$ of the 2nd stand. As stated previously, it is a drawback of the prior art techniques that, when a state including these deviations is fed back to the optimum control means, the optimum control means 112 reacts so as to annul these deviations and returns to the state without the deviations necessary for the elimination of the interference so that the non-interference control is destroyed.

In this embodiment, the quantities which are necessarily deviated by applying the optimum control means 112 and the non-interference control means 56 are presumed by the models 60 and 57 stated above and the deviation quantities $E_1$, $E_2$ and $E_3$ are obtained by subtracting them from the state quantities of the object to be controlled by means of an adder 50-1, 50-2. Usually a state feed back means feeds back deviations produced by external perturbations, model errors, etc., together with the state quantities varied by the control. That is, $\Delta\bar{h}_2$, $\Delta\bar{V}_{R2}$ and $\Delta\bar{T}_2$, which are resultants of the deviations $E_1$, $E_2$ and $E_3$ stated above and the model outputs $\Delta\bar{h}_2'$, $\Delta\bar{V}_{R2}'$ and $\Delta\bar{T}_2'$, are inputted as the state quantities of the optimum control means. Since $\Delta\bar{h}_2'$, $\Delta\hat{V}_{R2}'$ and $\Delta\bar{T}_2'$ varied by the non-interference control are removed from these $\Delta\bar{h}_2$, $\Delta\hat{V}_{R2}$, and $\Delta\bar{T}_2$, respectively, the optimum control means acts so as to annul the deviations $E_1$, $E_2$ and $E_3$ stated above without destroying the non-interference control system.

Although this invention has been explained above taking the control of the rolling mill as an example, this invention is not restricted thereto, but it can be applied widely to any multi-variable control system. Although specific explanation is omitted in order to avoid complexity, elimination of interference between the driving system and the steering system in automobiles, elimination of interference between different axes in a multi-axial robot, elimination of interference between different load-dispatching offices in an electric power supply system, etc., can be cited as application examples.

Therefore, hereinbelow this invention will be explained in a general form. First, an object to be controlled is divided into a plurality of blocks, and an aspect by which the interference is eliminated between the blocks will be explained.

FIG. 13 indicates the outline of a control system to which this invention is applied. In the figure, the state 2 of the object to be controlled 1 is inputted to a non-interference control system 3 and optimum control systems 4, 5 and 6. The optimum control systems 4, 5 and 6 determine operation quantities 7, 8 and 9 for the object to be controlled 1 based on the state 2. The non-interference control system 3 receives the state 2 stated above and operation quantities 7, 8 and 9 of the optimum control systems 4, 5 and 6, and determines operation quantities 10, 11 and 12 representing a combination of optimum control and non-interference control, which quantities are outputted to the object to be controlled 1. This invention is characterized, as described above, in that the object to be controlled is divided into a plurality of blocks so that each of the blocks has at least one operation quantity and that at least one block has more than two operation or control quantities. Further, the object to be controlled is controlled for every block. The state equation of the object to be controlled is written as follows:

$$\dot{X} = AX + BU \tag{15}$$

Here, by dividing the system matrix A into a diagonal matrix $A_D$ and a non-diagonal matrix $A_N$, the system matrix A can be expressed by the following Eq. (16):

$$A = A_D + A_N \tag{16}$$

Similarly, by dividing the control matrix B into a diagonal matrix $B_D$ and a non-diagonal matrix $B_N$, the control matrix B can be expressed by the following Eq. (17):

$$B = B_D + B_N \tag{17}$$

Then, the state vector X is divided into N blocks. However, this division into N blocks depends on the object to be measured and cannot be determined without variation. The division is effected from the point of view that the degree of the relation between operation or control quantities of different blocks obtained by the division is smaller than the degree of the relation between operation or control quantities within each of the blocks.

After dividing the state vector into N blocks, the operation vector U corresponding thereto is also divided into N blocks. Similarly, the system matrix and the control matrix are also divided into N blocks.

That is, the system matrix is decomposed into system minor matrices, whose elements are $a_{ij}$; the control matrix into control minor matrices, whose elements are $b_{ij}$; the state vector into state minor vectors, which are $X_i$; and the operation vector into operation minor vectors, which are $U_i$. In FIG. 14, Eq. (15) is expressed in the form of matrices by using these minor matrices and minor vectors. FIG. 15 shows matrices obtained by dividing the system matrix A indicated in FIG. 14 into $A_D$ and $A_N$ and the control matrix B into $B_D$ and $B_N$.

FIG. 16 shows the relation among the object to be controlled 1, the non-interference control system 3 and the optimum control system 4 for controlling a certain block within the object to be controlled.

The object to be controlled indicated in FIG. 16 expresses Eqs. (15), (16) and (17) in a block diagram. That is, a product of the state vector X 14 and the diagonal system matrix $A_D$ 15 and a product of X 14 and the non-diagonal system matrix $A_N$ 16 are inputted to an adder 13. That is, a product of the system matrix A and the state vector X 14, which is obtained by multiplying Eq. (16) by X, is produced in the adder 13 (the following Eq. (18)):

$$A_DX + A_NX = AX \quad (18)$$

A product of the operation vector U 18 and the diagonal control matrix $B_D$ 19 is inputted to an adder 17 and a product of the operation vector U 18 and the non-diagonal control matrix $B_N$ 20 is inputted to the adder 17 through the adder 13. That is, the product of the control matrix B and the operation vector U, expressed by the following Eq. (19):

$$B_DU + B_NU = BU \quad (19)$$

which is obtained by multiplying Eq. (17) by U 18, is inputted to the adder 17. Then the following Eg. (20):

$$AX + BU \quad (20)$$

which is the sum thereof with the product of the system matrix A and the state vector X, obtained by Eq. (18), is obtained by the adder 17. According to Eq. (15), the value thereof is equal to the differential $\dot{X}$ 21 of the state vector X. Since X 14 is an integral of $\dot{X}$ 21, $\dot{X}$ 21 is integrated through an integral matrix 22 and the state vector X 14 is obtained. In 22, S represents a Laplacian operator and II is a unit matrix.

Here it is assumed that the state vector is an n-th order vector and the operation vector has m inputs, the system matrix is a matrix of n x n and the control matrix is a matrix of n x m. When the internal state of the object to be controlled 1 is taken into account, in order to perform the non-interference control, it is necessary that the system matrix A and the control matrix B include only diagonal block elements. The adder 17 being considered, the product of the state vector X 14 and the non-diagonal system matrix $A_N$ 16 is applied as an interference term by feed back and the product of the operation vector U 18 and the non-diagonal control matrix $B_N$, which is the other interference term, is applied by feed forward. In order to perform the non-interference control with a high efficiency, it is desirable to effect feed forward compensation for the feed forward element and feed back compensation for the feed back element. This is because parallel treatment in the control system is possible in this way.

Since the control matrix B adds the operation vector U to the differential $\dot{X}$ of the state vector X by feed forward, this non-interference component is removed by feed forward compensation.

An instruction vector r 23 produced within the non-interference control system 3 becomes the operation vector U through feed forward compensation G 24 and is multiplied by the control matrix B.

In this case, if the general form of the control matrix B when the non-interference control is performed is represented by $B_D$, and if it is assumed that the non-interference control (feed forward term) is performed, the following Eq. (21) is valid:

$$(B_D + B_N)G = B_D' \quad (21)$$

According to a method generally used in this field, when the respective members of Eq. (21) are premultiplied by a pseudo inverse matrix of $(B_D+B_N)$, Eq. (22) is obtained:

$$G = (B_D+B) - B_D' \quad (22)$$

where $(B_D+B)-$ represents the pseudo inverse matrix of $B_D+B$.

Figure 17:
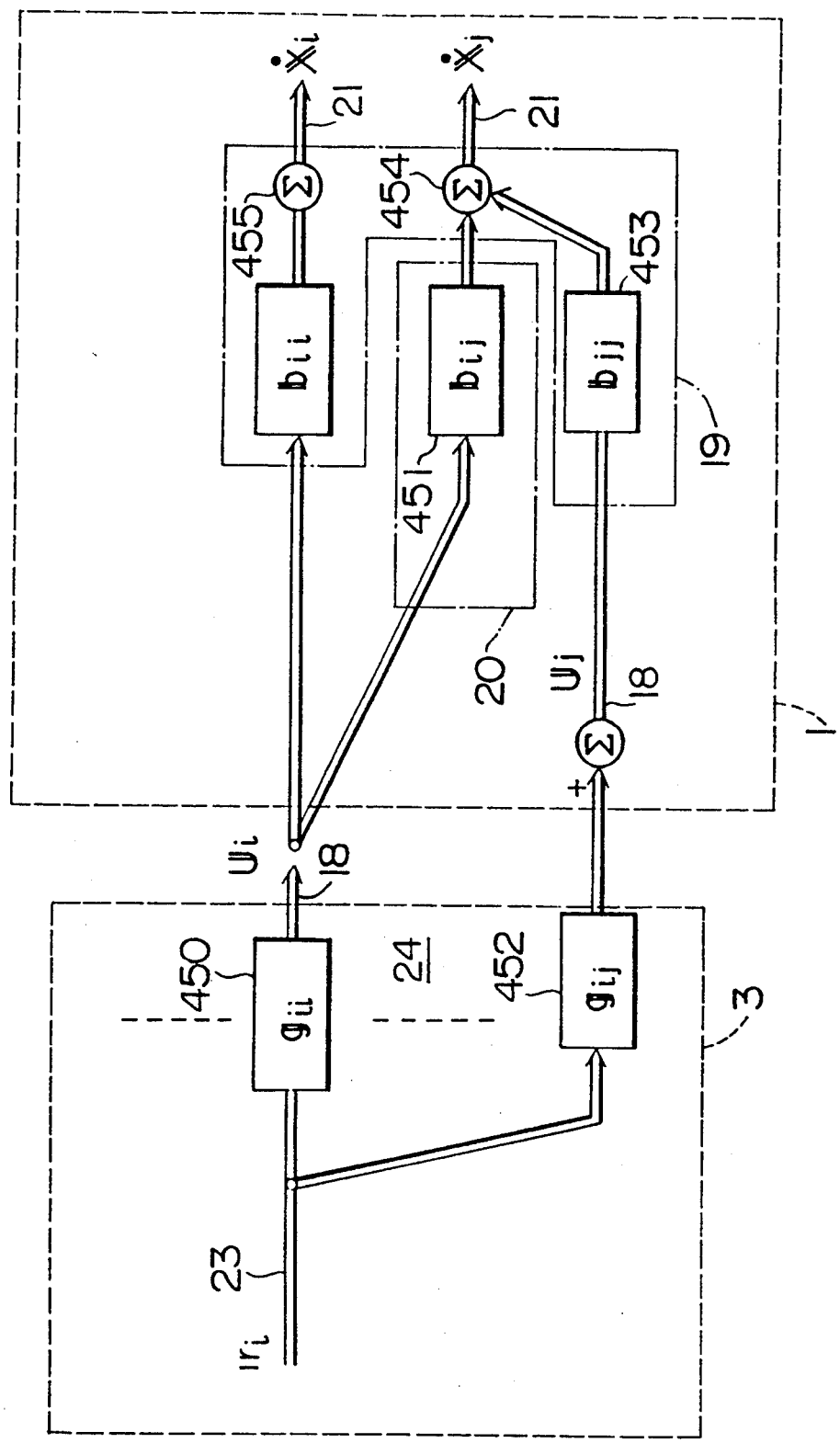
FIG. 17 is a diagram illustrating the construction of a control system for realizing the relation represented by Eq. (22) in the specification.

FIG. 17 shows a complete example of the method for realizing Eq. (22) and indicates the relation among the feed forward compensation element G 24, the operation vector U 18, the diagonal and non-diagonal control matrices $B_D$ and $B_N$, and the differential $\dot{X}$ 21 of the state vector. It illustrates $U_i$ related to the i-th block in the operation vector U and the instruction vector $r_i$ 23 therefor. The interference terms acting on the other blocks will be considered here, referring to FIG. 17.

Now the influences of the i-th block on the j-th block are considered. The instruction vector $r_i$ 23 becomes the operation minor vector $u_i$ 18 through the non-interference feed forward compensation element $g_{ii}$ 450 and further becomes the differential vector 21 of the state minor vector $X_j$ of the j-th block through the control minor matrix $b_{ij}$ 451 and an adder 454. Quantities based on elements of r other than the i-th element dicated in the figure are also inputted to the adder 454. These relations being expressed by an equation, the following Eq. (23) is obtained:

$$X_{ji} = b_{ij} \cdot g_{ii} \cdot r_i \quad (23)$$

where $X_{ji}$ represents the interference component of the i-th block on the j-th block. In order to annul this term, $r_i$ is added to the operation minor vector $u_j$ through non-interference element $g_{ij}$ 452 newly added. The operation quantity applied from $u_j$ is added to the differential of the state minor vector $X_j$ through the control minor matrix $b_{jj}$. The value thereof is expressed by the following Eq. (24):

$$\dot{X}_{ji}' = b_{jj}g_{ji}r_i \quad (24)$$

The interference of the i-th block on the j-th block is eliminated if the sum of Eqs. (23) and (24) is zero as shown in the following Eq. (25):

$$b_{ij}g_{ii}r_i + b_{jj}g_{ij}r_i = 0 \quad (25)$$

Rearranging Eq. (25), the following Eq. (26) is obtained:

$$g_{ij} = b_{ij} - b_{jj}g_{ii} \quad (26)$$

If these procedures are carried out successively until each of the elements becomes scalar (until 1-input-1-output is realized), the elimination of the interference is achieved as a whole.

Now the elimination of the interference of the interference component in the system matrix will be considered. Since the state is fed back by the feed back component, cancellation cannot be effected by the feed forward operation of this interference component operation quantity. Therefore, the state vector X is inputted to the feed back compensation element $F_B$ 25 indicated in FIG. 16; the output of $F_B$ 25 is applied to an adder 26; and the output of the adder 26 is applied to the feed forward compensation element G 24. Then the output thereof is applied to the differential $\dot{X}$ 21 of the state vector through the control matrix B (the first term in the middle member of the following Eq. (27)).

On the other hand, concerning the interference term, the state vector X 14 is applied to the differential $\dot{X}$ 21 of the state vector through the non-diagonal system matrix $A_N$ 16 (the second term in the middle member of the following Eq. (27)). When this term is annulled the elimination of the interference is established. Therefore, the elimination of the interference is achieved by determining the gain of the feed back compensation element $F_B$ 25 so that the following equation (27) is valid:

$$\dot{X}_{ji} = BGF_BX + A_NX = 0 \quad (27)$$

Rearranging Eq. (26), the following Eq. (28) is obtained:

$$BGF_B = -A_NF_B = -G^-B^-A_N \quad (28)$$

This non-interference control system 3 is disposed only for always eliminating the interference term of the object to be controlled and it is not constructed so as to be a control system making the object to be controlled respond as desired. Therefore, for this reason a control system for determining the operation quantities for every block is necessary. Since the elimination of the interference between different blocks is already achieved, with respect to the control system, each of the blocks can be considered as an independent object to be controlled, and if they are separately controlled, the kind of control thereof is immaterial. In this way it is an important effect that the freedom of the choice of the control system can be increased. Here the case where the optimum control system is adopted will be explained.

In FIG. 16, the state vector X 14 and a measurable external perturbation W are inputted to the optimum control system 4. The optimum control system 4 performs operations on the basis of these inputs and outputs the result 7 to the adder 26. The output of the optimum control system 4 described above is added to the output of the non-interference feed back compensation element $F_B$ 25 described above and the sum thereof is inputted to the feed forward compensation element G 24 stated above.

Figure 18:
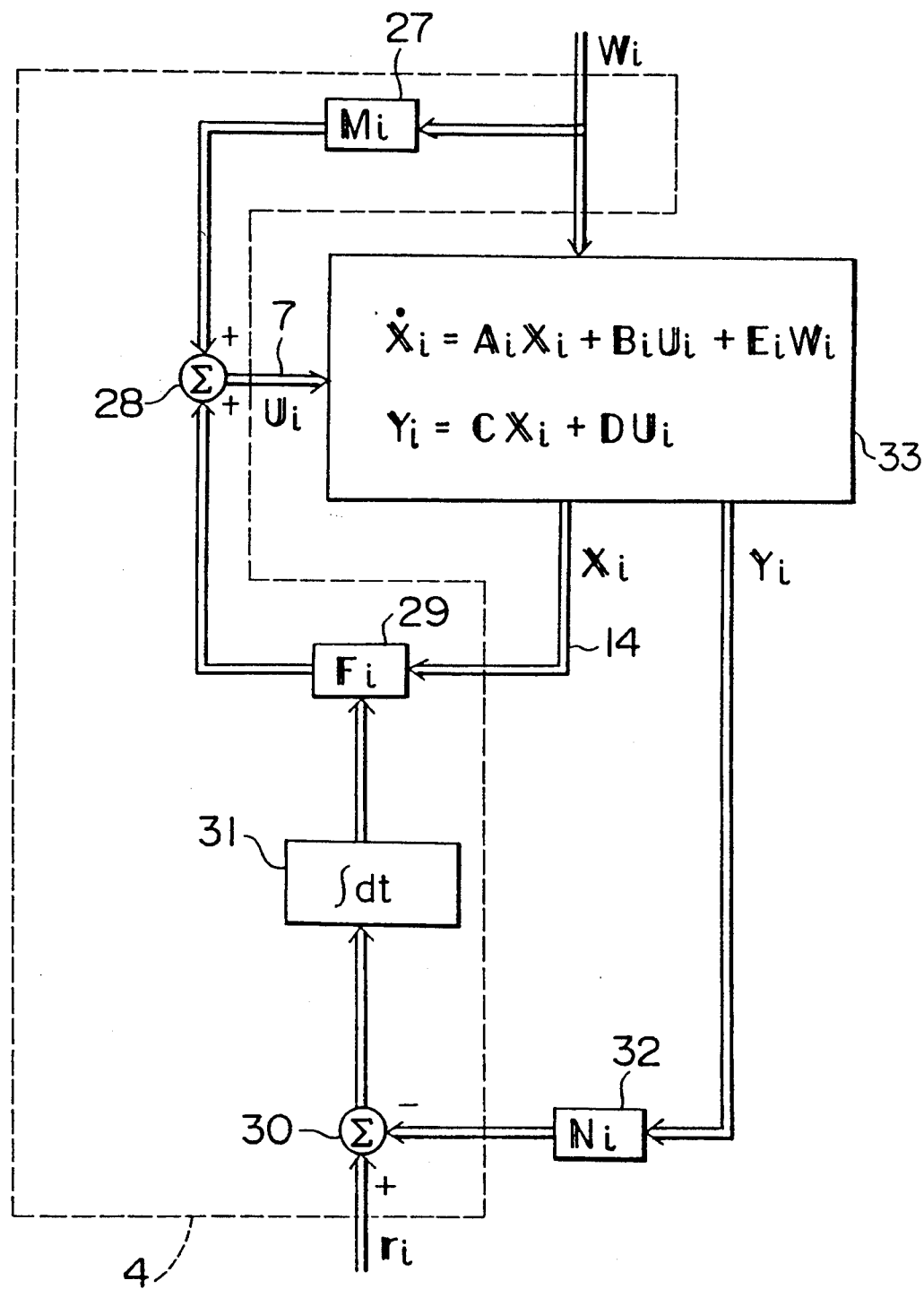
FIG. 18 is a diagram illustrating the internal structure of the optimum control system for the i-th block in the case where the object to be controlled is divided into a plurality of blocks.

The optimum control system 4 can be used for every block. The internal structure of the optimum control system for the i-th block is shown in FIG. 18 as an example. In the figure, the measurable external perturbation $W_i$ is inputted to an optimum control object 33 (hereinbelow called simply the control object) including both the object to be controlled 1 and the non-interference control system 3 as well as to an adder 28 through an optimum feed forward element $M_i$ 27.

An instruction vector $r_i$ for obtaining a desired response of the control system is inputted to an adder 30 and at the same time the output $Y_i$ of the control object 33 is inputted to the adder 30 through an optimum feed back element $N_i$ 32 to be subtracted. The difference thereof is inputted through an integral element 32 to the optimum feed back element $F_i$ 29 together with the state vector $X_i$ of the control object 33. The output of the optimum feed back element 29 is inputted to the adder 28. The output of the adder 28 is applied to the control object 33 as an instruction $U_i$ 7.

The values of the optimum control elements $M_i$ 27 and $F_i$ 29 can be obtained in the following manner.

That is, compensation elements $F_i$ and $M_i$ are obtained which minimize the state equation of the object to be controlled:

$$\dot{X}_i = A_iX_i + B_iU_i + E_iW_i \quad Y = C_iX_i + D_iU_i \quad (29)$$

as well as an evaluation function $$J = \int (X_i^TQX_i + U_i^TRU_i) \, dt \quad (30)$$

By using the solution $P_i$ of the Riccati equation represented by the following Eq. (31):

$$P_i\{A_i - B_iR_i^{-1}D_i^TQ_iC_i\} + \{A_i^T - C_i^TQ_iD_iR_i^{-1}B_i^T\}P_i - P_i \cdot B_iR^{-1}B_iP_i + C_i^T\{Q_i - Q_iD_iR_i^{-1}D_i^TQ_i\}C_i = 0 \quad (31)$$

$F_i$ can be obtained by the following Eq. (32):

$$F_i = -(P_i + D_i^TQ_iD_i)^{-1}(D_i^TQ_iC_i + B_iP_i) \quad (32)$$

$M_i$ can be obtained by the following Eqs. (33) and (34):

$$\gamma_i = -(A_i + B_iF_i)^{-1}B_i \quad (33)$$

$$\Theta_i = -(A_i + B_iF_i)^{-1}E_i \quad (34)$$

with $F_i$ stated above, as the following Eq. (35):

$$M_i = -(\gamma_i^TP_{r_i})^{-1}P_i^TP_{i\Theta_i} \quad (35)$$

Further, in the above example, the optimum control system 4 is treated as an optimum regulator. Since the optimum regulator can be easily extended to an ootimum servo, this invention can be applied to both of these situations.

Furthermore, apart from the optimum control system described above, various control systems can be applied to the means controlling each of the blocks used for realizing this invention. They are e.g. the pole assignment method by state feed back, the PID control, etc. In particular, according to the embodiment described above, since the interference between different stands of a tandem mill is eliminated, it is possible to apply the usual PID control separately to each of the stands. It is an important effect of this invention that a complicated system can be controlled by such a simple control system.

Now another aspect of this invention to suppress the interference among a plurality of systems having different functions will be explained.

Figure 19:
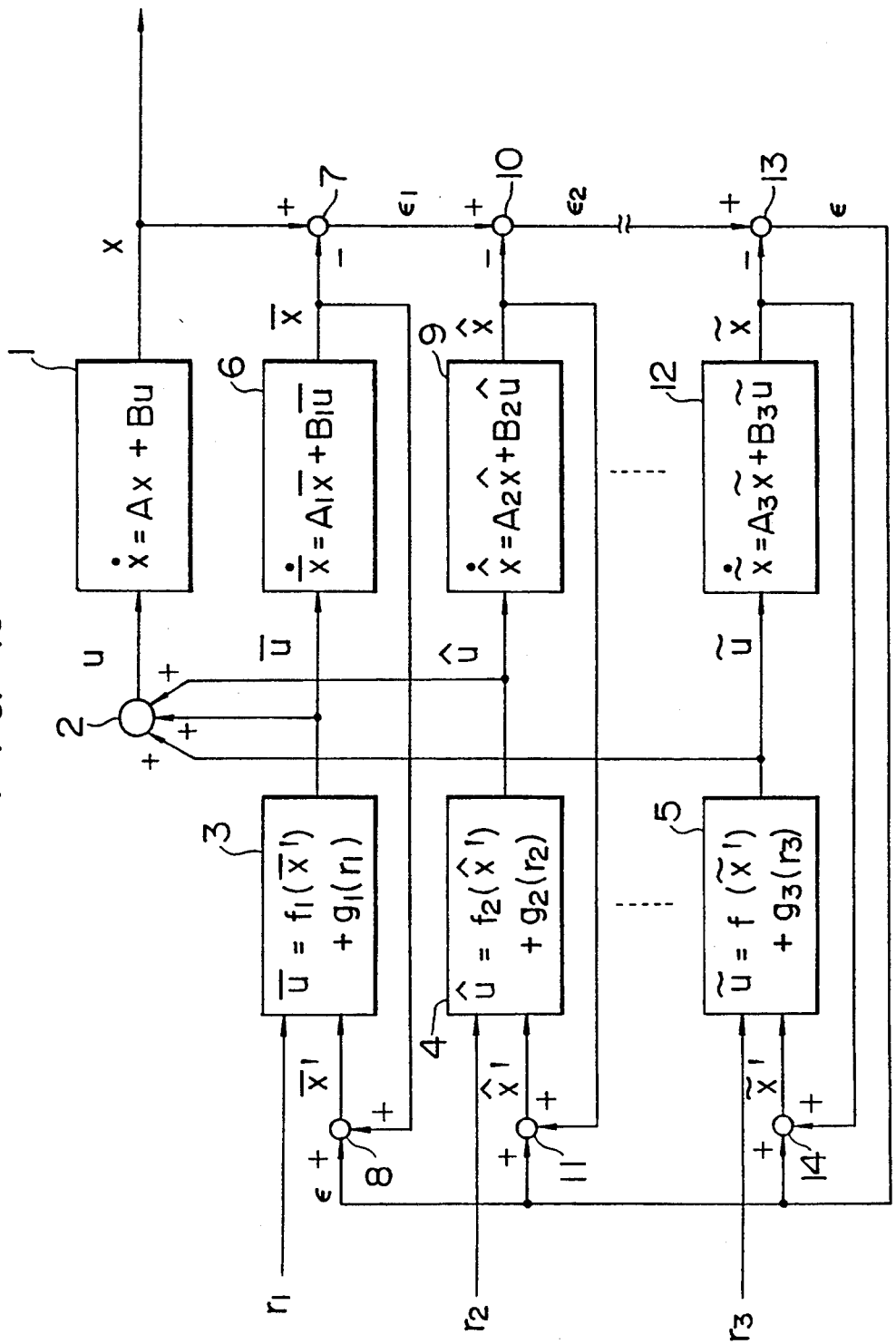
FIG. 19 is a diagram showing an example of the general construction of this invention for suppressing interference among a plurality of control systems having different functions.

FIG. 19 illustrates the outline of a control system to which this invention is applied. In the figure, an operation quantity u is inputted to the object to controlled 1, whose inner state is expressed by a state equation $\dot{x}=Ax+Bu$, and a state x is outputted therefrom. Here the state x is a vector of order n (n=1, 2, ... ); the operation quantity u is a vector of order m (m=1, 2, ... ); a system matrix A is a matrix of n x n; and an operation matrix B is a matrix of n×m. The operation quantity u is the output of an adder 2, where the outputs $\bar{u}$, $\hat{u}$ and $\tilde{u}$ of control means 3, 4 and 5, respectively, are summed.

The output $\bar{u}$ of the first control means 3 is inputted to the adder 2 and a model 6 of the object to be controlled; the state $\bar{x}$ of the model 6 is inputted to an adder 7; and the adder 7 subtracts the state $\bar{x}$ of the model 6 stated above from the state x of the object to be controlled 1 to obtain a control deviation $E_1$.

In the same way the output $\hat{u}$ of the second control means 4 is inputted to the adder 2 and a model 9 of the object to be controlled 1; the state $\hat{x}$ of the model 9 is inputted to an adder 10; and the adder 10 subtracts the state $\hat{X}$ stated above from the control deviation $E_1$ stated above to output a control deviation $E_2$.

In the same way the output $\tilde{u}$ of the k-th (k being an integer not smaller than 2) control means 5 is inputted to the adder 2 and a model 12 of the object to be controlled 1; the state $\tilde{x}$ of the model 12 is inputted to an adder 13; and the adder 13 subtracts the state $\tilde{x}$ stated above from the control deviation $E_2$ stated above to obtain a control deviation E. This control deviation E and the state $\bar{x}$ stated above are added to each other in an adder 8 to form a state $\bar{x}$ which is inputted to the control means 3 together with an instruction vector $r_1$.

In the same way the control deviation E is added to the states $\hat{x}$ and $\tilde{x}$ in adders 11 and 14 to form states $\hat{x}'$ and $\tilde{x}'$, respectively. These states $\hat{x}'$ and $\tilde{x}'$ are inputted to the control means 4 and 5 together with instruction vectors $r_2$ and $r_3$, respectively.

By means of such a structure, in the case where plurality of control means 3, 4 and 5 are applied to one object to be controlled 1, it is possible to eliminate the interference between the different control means. The working mode thereof will be explained below. FIG. 20A illustrates the structure in the case where the first control means 3 is applied to the object to be controlled 1. In this case the state x is fed back to the control means 3, which produces the instruction $\bar{u}$, taking the instruction $r_1$ into account, which instruction $\bar{u}$ is inputted to the object to be controlled 1.

This working mode decomposed in detail is shown in FIG. 20B. That is, if it is assumed that a model of the object to be controlled 1 is represented by 6, the control means 3 is designed on the basis of a control theory, adopting the model 6 as a control model. That is, the control means 3 presumes that the state x of the object to be controlled 1 is varied as expressed by the state $\bar{x}$ of the control model 6 when a certain operation quantity $\bar{u}$, which is the output thereof, is inputted to the object to be controlled 1.

However, in practice, deviations take place due to non-linearity, etc., of the object to be controlled 1, external perturbation or precision in the identification of the model. These produce E in FIG. 20B. This means that the state x of the object to be controlled 1 is divided into the state $\bar{x}$ varying depending on the control by the control means 3 and the control deviation E. Since the control rule of the control means is a multi-variable control rule and the state x is fed back, the state x represented by the sum of the control deviation E separated by the adder 7 and the state $\bar{x}$ varied by the control is fed back. In other words, owing to the structure indicated in FIG. 20A, it becomes possible to divide the state x into the control deviation E and the state $\bar{x}$ varying depending on the control by the control means 3 by adopting the model 6.

Figure 21:
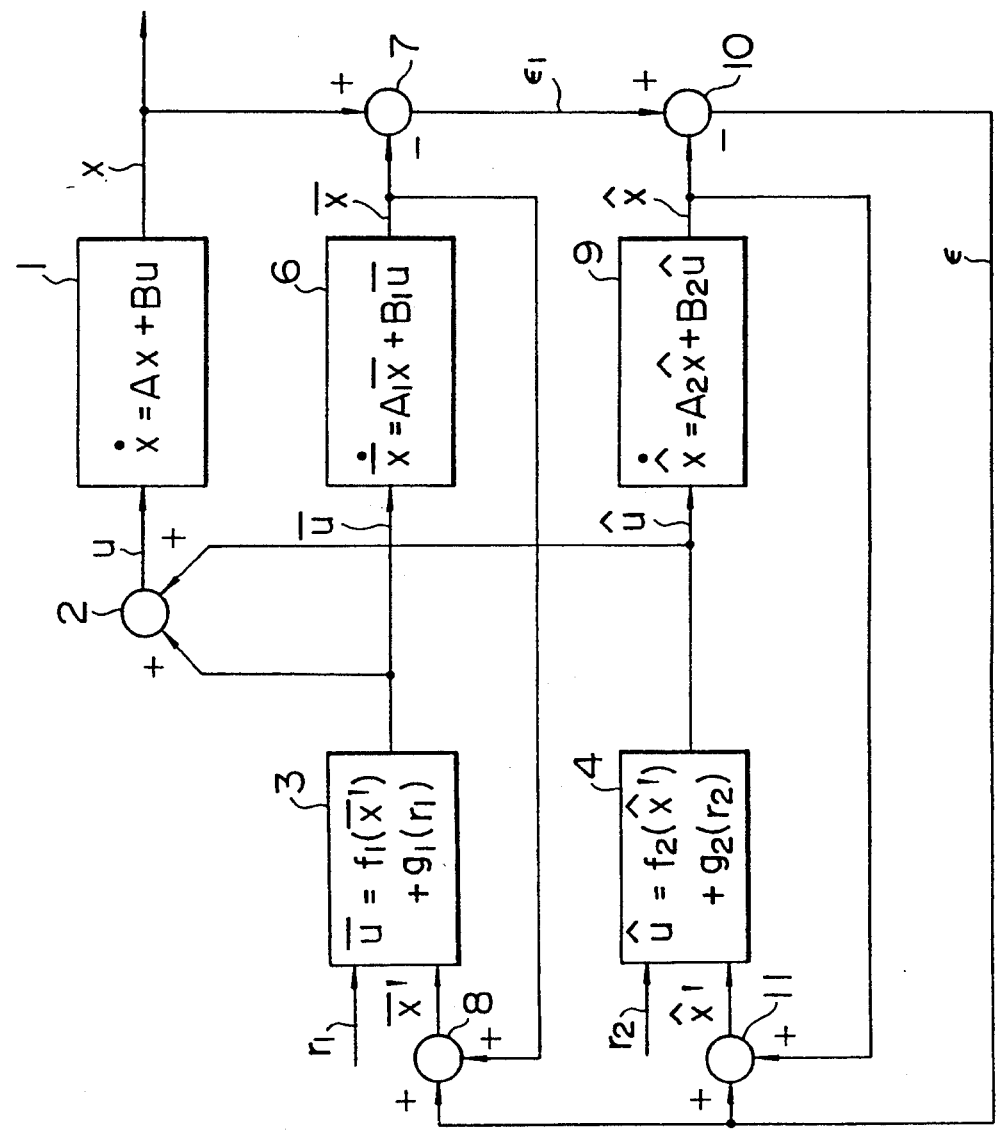
FIG. 21 is a diagram illustrating the construction of a control system in the case where two control means having different functions are applied to an object to be controlled.

Now FIG. 21 shows a case where two control means 3 and 4 are applied to one object to be controlled 1. The working modes of the control means 3, the model 6 and the object to be controlled 1 are identical to those indicated in FIG. 20B, but the operation quantity u inputted to the object to be controlled 1 is the sum of the operation quantities $\bar{u}$ and $\hat{u}$. Further, the output $E_1$ of the adder 7 includes also the state $\hat{x}$ varying depending on the control by the control means 4. Therefore, the state $\hat{x}$ varied by the control means 4 is presumed by means of a model 9 and the state $\hat{x}$ which has been varied is subtracted from $E_1$ by means of an adder 10 to obtain the control deviation E. This control deviation E is independent of both the control means 3 and 4. That is, the influences of the control means 3 and 4 are excluded from E. As a result, the control means 3 and 4 can effect their control independently.

Next, as viewed from the control means 3, the structure indicated in FIG. 21 is equivalent to FIG. 20B. On the other hand, if the second control means 4 is replaced by the first control means 3 and the model 6 by the model 9, the structure works similarly, and thus it is ensured that the two control means 3 and 4 work independently of each other.

As described above, according to the embodiment of this invention, since the variations of the state produced by operation of the other control means can be separated in the case where one object to be controlled by more than two control means, the interference between different control means can be eliminated.

FIG. 22 illustrates another embodiment of this invention. The difference thereof from that indicated in FIG. 19 consists in that only one model 15 is disposed for the object to be controlled 1, contrary to the fact that the models 6, 9 and 12 of the object to be controlled 1 are used as indicated in FIG. 19 and the outputs thereof are applied to the adders 7, 10 and 13. The operation quantity u of the model 15 is identical to the operation quantity of the object to be controlled 1. The state x' of the model 15 is inputted to the adder 7 and the state x' stated above of the model 15 is subtracted from the state x of the object to be controlled 1 in the adder 7 to obtain the control deviation E. Just as indicated in FIG. 19, E is fed back to the control means 3, 4 and 5 through the adders 8, 11 and 14.

By means of such a structure the control deviation E is added to the states $\bar{x}$, $\hat{x}$ and $\tilde{x}$ which are the outputs of the models 6, 9 and 12, respectively, and the results are inputted to the respective control means 3, 4 and 5 as the state feed back. As a result, the working mode in this embodiment is equivalent to that for the control system indicated in FIG. 19.

On the other hand, by means of such a structure, since there is disposed a model 15 acting similarly to the object to be controlled 1, it is possible to obtain the state x' of the model 15 corresponding to the state x of the object to be controlled 1, and thus an advantage can be obtained that the working mode of the control system becomes clearer. In addition, tuning of the model is facilitated.

Figure 23:
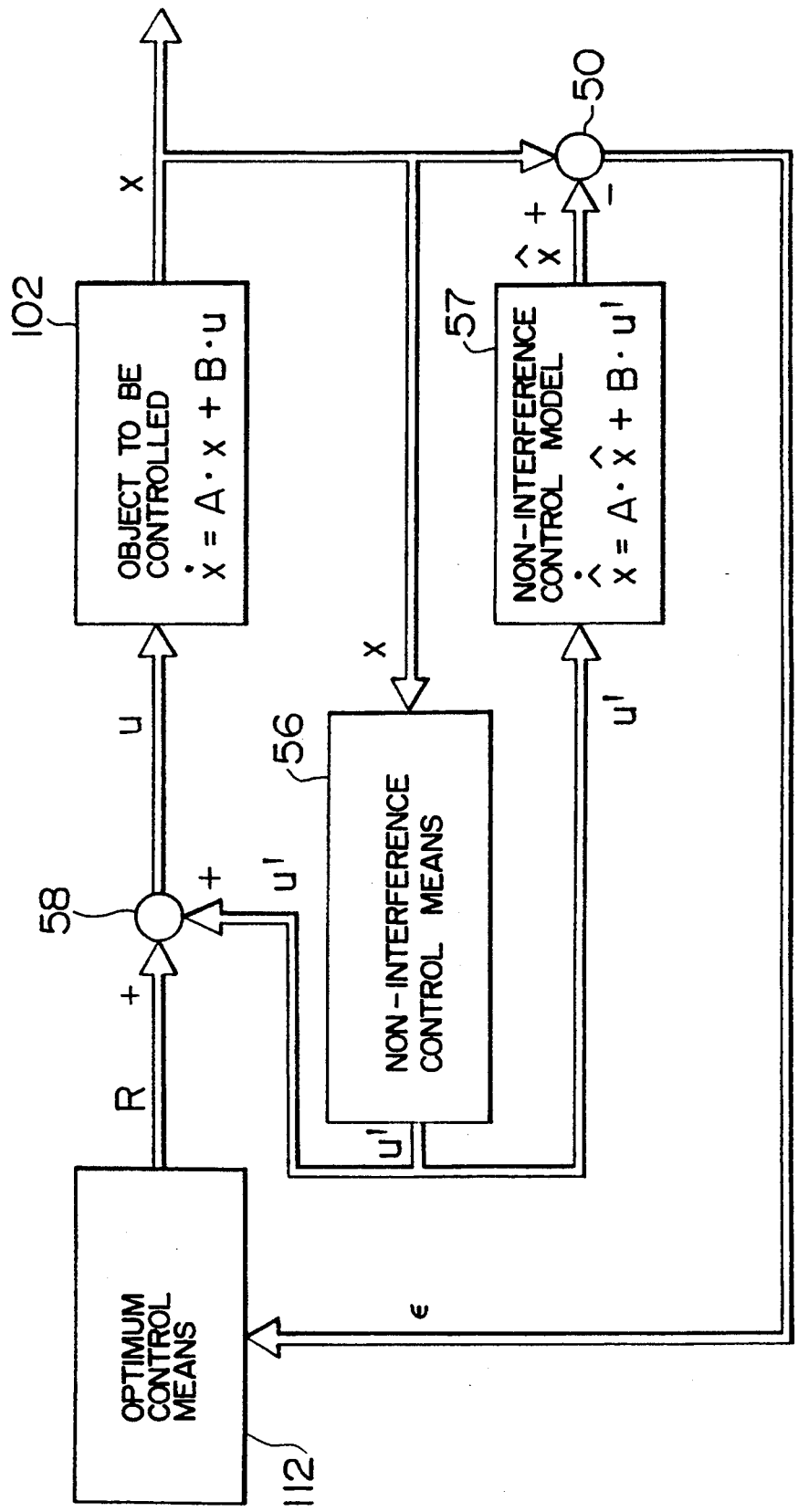
FIG. 23 is a diagram showing still another example of the general construction of this invention for suppressing interference among a plurality of control systems having different functions.

FIG. 23 illustrates still another embodiment of this invention. The difference from the embodiment indicated in FIG. 12 consists in that the optimum control model 60 in FIG. 12 is omitted.

In FIG. 23, the state x of an object to be controlled 102 is inputted to a non-interference control means 56 and an adder 50. The non-interference control means 56 determines an operation quantity u' based on the state x, which quantity u' is inputted to an adder 58 and a non-interference control model 57. The output x̂ of the non-interference control model 57 is inputted to the adder 50, which subtracts x̂ from the state x stated above to obtain a control deviation E. It is only the state deviated due to the optimum control means 112 that is removed from the control deviation E, which is fed back to an optimum control means 112. The optimum control means 112 determines an operation quantity R by a state feed back operation. This operation quantity R is inputted to the adder 58. The adder 58 adds R to u' stated above and determines an operation quantity u applied to the object to be controlled 102.

In this embodiment, almost no state deviations of the optimum control model 60 indicated in FIG. 12 take place. This is because the control of the optimum control means 112 is a problem for the optimum regulator, which works so as to always annul the state deviations, and therefore almost no state deviations take place.

On the other hand, taking a tandem rolling mill. as an example, in the case where state deviations take place in another stand, since the state deviations are used for the feed forward control, the reference value for the control is moved and the non-interference control system effects the control on the assumption that the state deviations take place.

INDUSTRIAL APPLICABILITY

Bringing the above statements together, it can be understood that the model cannot be omitted for a servo problem, a tracking problem, a feed forward control, etc., for which state deviations are presumed, but it can be omitted for a control system such as a regulator problem, etc., for which state deviations are kept to substantially zero.

As explained above, according to this invention, even for a large scale object to be controlled having a number of control quantities, since the object is divided into a plurality of blocks so that interference between different blocks is eliminated, a non-interference control suitable for eliminating interference between different control quantities can be achieved without enlarging or complicating the control device.

Further, more than two control devices having different functions can be used for an object to be controlled while eliminating interference therebetween. Furthermore, another effect can be obtained wherein control deviations are reduced by having each of the control devices control an aspect of the object for which it is especially suited.

We claim:

1. A control device for controlling an object by means of a plurality of control means, each of said control means comprising:
   presuming means for presuming variations of state quantities of said object which are affected by operation quantities obtained by said control means;
   means for obtaining control deviations of the state quantities by subtracting the variations of said state quantities presumed by said presuming means from actual state quantities of said object; and
   means for adding said presumed variations of state quantities and said control deviations to each other to obtain sums and inputting the sums to said control means.

2. A control device according to claim 1, wherein said presuming means comprises first presuming means for presuming variations of said state quantities of said object in response to an operation quantity obtained by summing operation quantities from said plurality of control means, and second presuming means for presuming variations of said state quantities of said object in response to respective ones of the operation quantities from the plurality of control means.

3. A control device for controlling an object by means of at least first control means and second control means having mutually different functions, comprising:
   presuming means for presuming variations of state quantities of said object which are affected by first operation quantities obtained by said first control means;
   means for obtaining deviations of the presumed variations of the state quantities from actual variations of the state quantities caused by inputting said first operation quantities to said object; and
   means for inputting said deviations to said second control means;
   wherein said second control means calculates and determines second operation quantities for said object on the basis of said deviations.

4. A control device according to claim 3, wherein said object has a plurality of state quantities and is controlled by a plurality of operation quantities, said first control means is a non-interference control system which eliminates interference between said state quantities, and said second control means is an optimum control system.

5. A control device according to claim 3 or 4, wherein said object to be controlled is a tandem rolling mill having a plurality of rolling stands, and said first control means controls the rolling stands of said tandem rolling mill such that interference between the rolling stands is eliminated.

6. A non-interference control system for an object having a plurality of state quantities and controlled by a plurality of operation quantities, wherein varying the operation quantities produces mutual interference between the state quantities, comprising:
   a plurality of partial control systems each having at least two state quantities and controlled by at least two operation quantities,
   (a) wherein the partial control systems are obtained by dividing the object to be controlled into the partial control systems such that varying the operation quantities of any one of the partial control systems produces a greater degree of mutual interference between the state quantities of the one partial control system than between the state quantities of any other one of the partial control systems, and (b) wherein each of the partial control systems includes respective non-interference control means for eliminating mutual interference only within the allocated partial control system by eliminating only mutual interference between the state quantities of the associated partial control system produced by varying the operation quantities of the associated partial control system; and non-interference control means for eliminating mutual interference only between the partial control systems by eliminating only mutual interference between the state quantities of each of the partial control systems produced by varying the operation quantities of all other ones of the partial control systems.

* * * * *